United States Patent
Morita et al.

(10) Patent No.: US 9,413,908 B2
(45) Date of Patent: Aug. 9, 2016

(54) IMAGE FORMING APPARATUS REMOTELY OPERATED BY EXTERNAL TERMINAL, METHOD FOR CONTROLLING IMAGE FORMING APPARATUS, RECORDING MEDIUM, AND IMAGE FORMING SYSTEM INCLUDING IMAGE FORMING APPARATUS

(71) Applicant: Konica Minolta, Inc., Chiyoda-ku (JP)

(72) Inventors: Mitsutaka Morita, Hachioji (JP); Yoichi Kurumasa, Toyokawa (JP); Yoshiyuki Tamai, Toyohashi (JP); Mie Kawabata, Toyokawa (JP); Ryosuke Nishimura, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 216 days.

(21) Appl. No.: 14/085,911

(22) Filed: Nov. 21, 2013

(65) Prior Publication Data
US 2014/0146358 A1 May 29, 2014

(30) Foreign Application Priority Data

Nov. 28, 2012 (JP) ................................. 2012-260330

(51) Int. Cl.
*H04N 1/00* (2006.01)

(52) U.S. Cl.
CPC ....... *H04N 1/00352* (2013.01); *H04N 1/00395* (2013.01); *H04N 1/00408* (2013.01); *H04N 1/00413* (2013.01); *H04N 1/00424* (2013.01)

(58) Field of Classification Search
CPC ........................ H04N 1/00973; H04N 1/00352
See application file for complete search history.

(56) References Cited

U.S. PATENT DOCUMENTS

2005/0225540 A1 10/2005 Kawakami et al.
2006/0290680 A1 12/2006 Tanaka et al.
(Continued)

FOREIGN PATENT DOCUMENTS

JP 02-112013 A 4/1990
JP 11-004809 A 1/1999
(Continued)

OTHER PUBLICATIONS

Office Action (Notification of Reason for Rejection) issued on Dec. 9, 2014, by the Japan Patent Office in corresponding Japanese Patent Application No. 2012-260330, and an English Translation of the Office Action. (6 pages).
(Continued)

*Primary Examiner* — Peiyong Weng
(74) *Attorney, Agent, or Firm* — Buchanan Ingersoll & Rooney PC

(57) ABSTRACT

An image forming apparatus remotely operated by an external terminal includes a generation unit generating a first composite image by combining an operation screen image corresponding to an operation screen of the image forming apparatus that includes software keys, and the hardware key area image of an area including hardware key images corresponding to hardware keys of the image forming apparatus, a setting unit not setting a dead area within the hardware key images but setting the dead area in a portion of an area of at least one software key among the software keys, the portion being on a side close to the hardware key area image, and the at least one software key being adjacent to the hardware key area image, and a transmission unit transmitting the first composite image as a remote operation image used in remotely operating the image forming apparatus, to the external terminal.

26 Claims, 23 Drawing Sheets

(56) References Cited

U.S. PATENT DOCUMENTS

| | | | |
|---|---|---|---|
| 2012/0044170 A1* | 2/2012 | Homma | G06F 3/0488 345/173 |
| 2012/0257244 A1 | 10/2012 | Hara | |
| 2014/0104217 A1 | 4/2014 | Horiguchi | |

FOREIGN PATENT DOCUMENTS

| | | |
|---|---|---|
| JP | 2000-081933 A | 3/2000 |
| JP | 2002-281195 A | 9/2002 |
| JP | 2005-284379 A | 10/2005 |
| JP | 2008-252897 A | 10/2008 |
| JP | 2012-43180 A | 3/2012 |
| JP | 2012-221068 A | 11/2012 |
| JP | 2012-248068 A | 12/2012 |

OTHER PUBLICATIONS

First Notice of Opinion on Examination issued in corresponding Chinese Patent Application No. 2013106258205; dated Nov. 30, 2015, and English translation (12 pages).

* cited by examiner

IMAGE FORMING APPARATUS REMOTELY OPERATED BY EXTERNAL TERMINAL, METHOD FOR CONTROLLING IMAGE FORMING APPARATUS, RECORDING MEDIUM, AND IMAGE FORMING SYSTEM INCLUDING IMAGE FORMING APPARATUS This application is based on Japanese Patent Application No. 2012-260330 filed on Nov. 28, 2012, the contents of which are hereby incorporated by reference.

BACKGROUND OF THE INVENTION

1. Technical Field

The present invention relates to an image forming apparatus and a technique related thereto.

2. Related Art

There are techniques for setting a dead area (an area in which manual input by an operator cannot be received) around the entire perimeter of each software key in operation screens of image forming apparatuses in order to prevent users from mishitting software keys disposed close to one another. For example, Japanese Patent Application Laid-Open No. 2000-81933 (Patent Document 1) discloses a technique for setting a dead area around (the entire perimeter of) each operation key displayed on a liquid crystal display (LCD) of an image forming apparatus.

There are also techniques for remotely operating image forming apparatuses using external terminals. With these techniques, remote operation images transferred from an image forming apparatus to an external terminal are used to remotely operate the image forming apparatus.

With the techniques for remotely operating an image forming apparatus, it may be required to not only remotely operate operation screens of the image forming apparatus but also remotely operate hardware keys of the image forming apparatus. In this case, for example, it is conceivable that a composite image generated by combining an operation screen image and a hardware key area image is used as a remote operation image, the operation screen image corresponding to an operation screen of the image forming apparatus, and the hardware key area image being an image of an area that includes hardware key images corresponding respectively to hardware keys of the image forming apparatus.

In such a composite image (remote operation image) generated by combining the two images, however, a plurality of software keys (also referred to as a "software key group") within the operation screen image and a plurality of hardware key images (also referred to as a "hardware key image group") within the hardware key area image may be undesirably disposed too close to each other, increasing the likelihood of mishitting of the keys.

In contrast, the application of the technique of Patent Document 1 described above allows a dead area to be set around the entire perimeter of each software key in the software key group and around the entire perimeter of each hardware key image in the hardware key image group. The dead areas provided between the software keys and the hardware key images make it possible to prevent users from mishitting the keys and the images.

However, if, for example, individual hardware key images in the hardware key image group are disposed close to one another similarly to the close disposition of the software key group and the hardware key image group, the following problem may occur. Specifically, the dead area set around the entire perimeter of one hardware key image in the hardware key image group may be superimposed on another hardware key image adjacent to the hardware key image. This consequently narrows a sensitive area (an area in which manual input by an operator can be received) of the other hardware key image and ultimately reduces the operability of the entire hardware key image group.

Such a problem can also occur with the other two types of key groups.

SUMMARY OF THE INVENTION

It is an object of the present invention to provide a technique with which, even if two types of key groups included in an operation screen image are disposed close to each other, it is possible to prevent users from mishitting these two key groups and to ensure excellent operability of at least one of the key groups.

According to a first aspect of the present invention, the image forming apparatus remotely operated by an external terminal includes a generation unit configured to generate a first composite image by combining an operation screen image and a hardware key area image, the operation screen image corresponding to an operation screen of the image forming apparatus, the operation screen including a plurality of software keys, and the hardware key area image being an image of an area that includes a plurality of hardware key images corresponding to a plurality of hardware keys of the image forming apparatus, a setting unit configured to not set a dead area within the plurality of hardware key images and to set the dead area in a portion of an area of at least one software key among the plurality of software keys, the portion being on a side close to the hardware key area image, and the at least one software key being adjacent to the hardware key area image, a transmission unit configured to transmit the first composite image as a remote operation image to the external terminal, the remote operation image being an image for use in remote operation of the image forming apparatus, a reception unit configured to receive first manual input information from the external terminal, the first manual input information being information on manual input to the first composite image displayed as the remote operation image in the external terminal, and a determination unit configured to determine a content of manual input by an operator on the basis of the first manual input information. The determination unit is configured to, when determining on the basis of the first manual input information that the external terminal accepts a touch operation in which a portion other than the dead area is touched within an area of one software key of the at least one software key, determine that there is manual input to the one software key, when determining on the basis of the first manual input information that the external terminal accepts a touch operation in which the dead area within the area of the at least one software key is touched, determine that there is no manual input to the at least one software key, and when determining on the basis of the first manual input information that the external terminal accepts a touch operation in which one hardware key image among the plurality of hardware key images is touched, determine that there is manual input to the one hardware key image.

According to a second aspect of the present invention, the image forming apparatus includes a generation unit configured to generate a first composite image by combining a first image and a second image, the first image including a first software key group, and the second image being an image of an area that includes a second software key group different from the first software key group, a setting unit configured to not set a dead area within an area of the second software key group and to set the dead area in a portion of an area of at least one software key in the first software key group adjacent to the second software key group, the portion being on a side close to the second image, an input/output control unit configured to display and output the first composite image as an operation screen of the image forming apparatus to and on an input/output unit of the image forming apparatus, and receive first manual input information on manual input to the first composite image displayed as the operation screen, and a determination unit configured to determine a content of manual input by an operator, on the basis of the first manual input information. The determination unit is configured to, when determining on the basis of the first manual input information that the input/output unit accepts a touch operation in which a portion other than the dead area is touched within an area of a first software key that is one of the at least one software key, determine that there is manual input to the first software key, when determining on the basis of the first manual input information that the input/output unit accepts a touch operation in which the dead area within an area of the at least one software key among the first software key group is touched, determine that there is no manual input to the at least one software key, and when determining on the basis of the first manual input information that the input/output unit accepts a touch operation in which a second software key that is one software key in the second software key group is touched, determine that there is manual input to the second software key.

According to a third aspect of the present invention, a non-transitory computer-readable recording medium records a program for causing a computer built into an image forming apparatus that is remotely operated by an external terminal to execute the steps of a) generating a first composite image by combining an operation screen image and a hardware key area image, the operation screen image corresponding to an operation screen of the image forming apparatus, the operation screen including a plurality of software keys, and the hardware key area image being an image of an area that includes a plurality of hardware key images corresponding to a plurality of hardware keys of the image forming apparatus, b) not setting a dead area within the plurality of hardware key images but setting the dead area in a portion of an area of at least one software key among the plurality of software keys, the portion being on a side close to the hardware key area image, and the at least one software key being adjacent to the hardware key area image, c) transmitting the first composite image as a remote operation image to the external terminal, the remote operation image being an image for use in remote operation of the image forming apparatus, d) receiving first manual input information from the external terminal, the first manual input information being information on manual input to the first composite image displayed as the remote operation image in the external terminal, and e) determining a content of manual input by an operator on the basis of the first manual input information. The step e) includes the steps of e-1) when it is determined on the basis of the first manual input information that the external terminal accepts a touch operation in which a portion other than the dead area is touched within an area of one software key of the at least one software key, determining that there is manual input to the one software key, e-2) when it is determined on the basis of the first manual input information that the external terminal accepts a touch operation in which the dead area within the area of the at least one software key is touched, determining that there is no manual input to the at least one software key, and e-3) when it is determined on the basis of the first manual input information that the external terminal accepts a touch operation in which one hardware key image among the plurality of hardware key images is touched, determining that there is manual input to the one hardware key image.

According to a fourth aspect of the present invention, a non-transitory computer-readable recording medium records a program for causing a computer built into an image forming apparatus remotely operated by an external terminal to execute the steps of a) generating a first composite image by combining a first image and a second image, the first image including a first software key group, and the second image being an image of an area that includes a second software key group different from the first software key group, b) not setting a dead area within an area of the second software key group but setting the dead area in a portion of an area of at least one software key in the first software key group adjacent to the second software key group, the portion being on a side close to the second image, c) displaying and outputting the first composite image as an operation screen of the image forming apparatus to and on an input/output unit of the image forming apparatus, d) receiving first manual input information on manual input to the first composite image displayed as the operation screen, and e) determining a content of manual input by an operator, on the basis of the first manual input information. The step e) includes the steps of e-1) when it is on the basis of the first manual input information that the input/output unit accepts a touch operation in which a portion other than the dead area is touched within an area of a first software key that is one of the at least one software key, determining that there is manual input to the first software key, e-2) when it is determined on the basis of the first manual input information that the input/output unit accepts a touch operation in which the dead area within an area of the at least one software key among the first software key group is touched, determining that there is no manual input to the at least one software key, and e-3) when it is on the basis of the first manual input information that the input/output unit accepts a touch operation in which a second software key that is one software key in the second software key group is touched, determining that there is manual input to the second software key.

According to a fifth aspect of the present invention, an image forming system includes an image forming apparatus, and an external terminal configured to remotely operate the image forming apparatus. The image forming apparatus includes a generation unit configured to generate a first composite image by combining an operation screen image and a hardware key area image, the operation screen image corresponding to an operation screen of the image forming apparatus, the operation screen including a plurality of software keys, and the hardware key area image being an image of an area that includes a plurality of hardware key images corresponding to a plurality of hardware keys of the image forming apparatus, a setting unit configured to not set a dead area within the plurality of hardware key images and to set the dead area in a portion of an area of at least one software key among the plurality of software keys, the portion being on a side close to the hardware key area image, and the at least one software key being adjacent to the hardware key area image, a first transmission unit configured to transmit the first composite image as a remote operation image to the external terminal, the remote operation image being an image for use in remote operation of the image forming apparatus, a first reception unit configured to receive first manual input information from the external terminal, the first manual input information being information on manual input to the first composite image displayed as the remote operation image in the external terminal, and a determination unit configured to determine a content of manual input by an operator on the basis of the first manual input information. The determination unit is configured to, when determining on the basis of the first manual input information that the external terminal accepts a touch operation in which a portion other than the dead area is touched within an area of one software key of the at least one software key, determine that there is manual input to the one software key, when determining on the basis of the first manual input information that the external terminal accepts a touch operation in which the dead area within the area of the at least one software key is touched, determine that there is no manual input to the at least one software key, and when determining on the basis of the first manual input information that the external terminal accepts a touch operation in which one hardware key image among the plurality of hardware key images is touched, determine that there is manual input to the one hardware key image. The external terminal includes a second reception unit configured to receive the first composite image from the image forming apparatus, an input/output control unit configured to display the first composite image as the remote operation image on an input/output unit of the external terminal and receive manual input to the remote operation image, and a second transmission unit configured to transmit manual input information on manual input to the remote operation image to the image forming apparatus.

According to a sixth aspect of the present invention, a control method for controlling an image forming apparatus remotely operated by an external terminal, includes the steps of a) generating a first composite image by combining an operation screen image and a hardware key area image, the operation screen image corresponding to an operation screen of the image forming apparatus, the operation screen including a plurality of software keys, and the hardware key area image being an image of an area that includes a plurality of hardware key images corresponding to a plurality of hardware keys of the image forming apparatus, b) not setting a dead area within the plurality of hardware key images but setting the dead area in a portion of an area of at least one software key among the plurality of software keys, the portion being on a side close to the hardware key area image, and the at least one software key being adjacent to the hardware key area image, c) transmitting the first composite image as a remote operation image to the external terminal, the remote operation image being an image for use in remote operation of the image forming apparatus, d) receiving first manual input information from the external terminal, the first manual input information being information on manual input to the first composite image displayed as the remote operation image in the external terminal, and e) determining a content of manual input by an operator on the basis of the first manual input information. The step e) includes the steps of e-1) when it is determined on the basis of the first manual input information that the external terminal accepts a touch operation in which a portion other than the dead area is touched within an area of one software key of the at least one 1.5 software key, determining that there is manual input to the one software key, e-2) when it is determined on the basis of the first manual input information that the external terminal accepts a touch operation in which the dead area within the area of the at least one software key is touched, determining that there is no manual input to the at least one software key, and e-3) when it is determined on the basis of the first manual input information that the external terminal accepts a touch operation in which one hardware key image among the plurality of hardware key images is touched, determining that there is manual input to the one hardware key image.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Hereinafter, embodiments of the present invention will be described with reference to the drawings.

1. First Embodiment 1-1. Configuration

Figure 1:
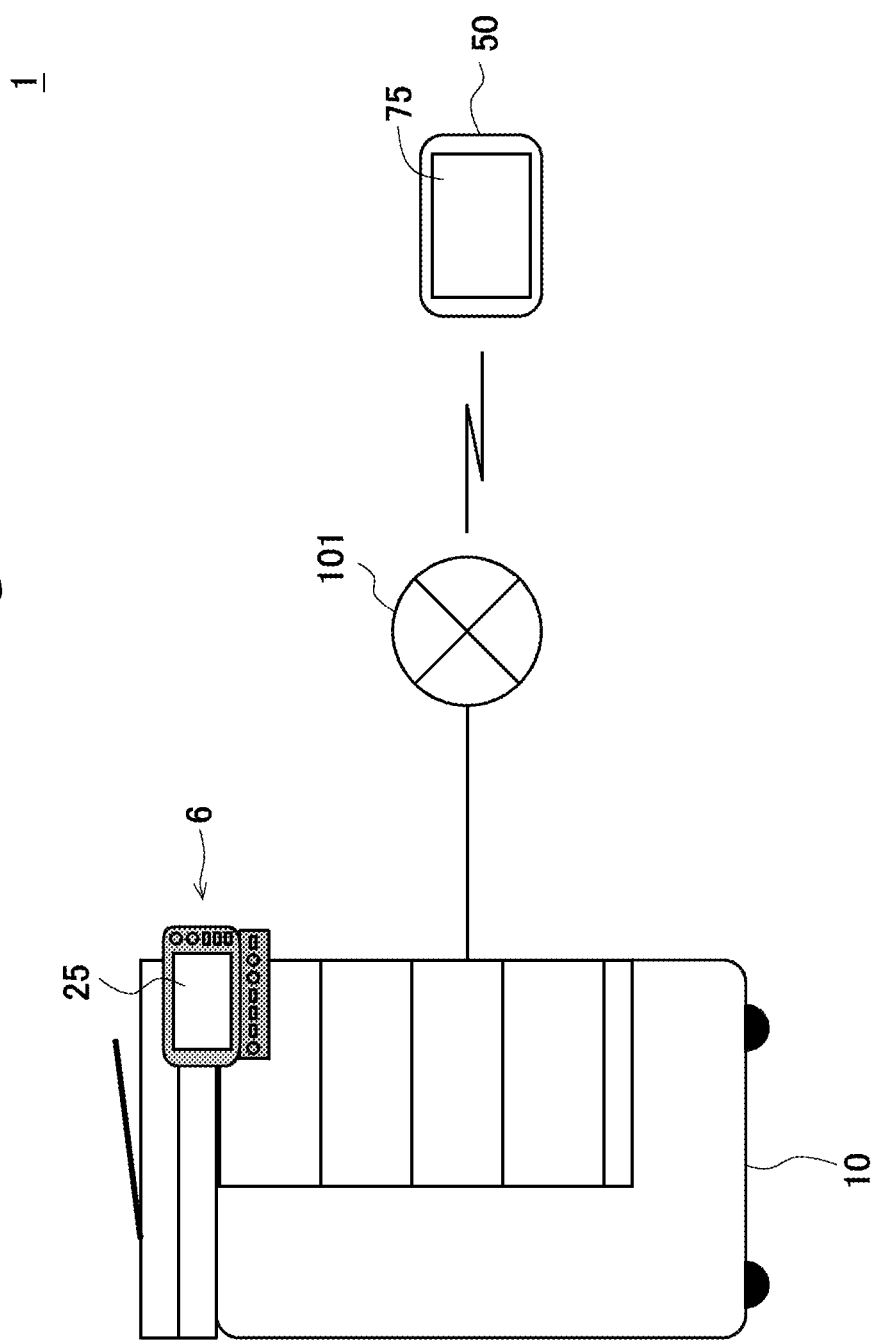
FIG. 1 shows a schematic configuration of an image forming system according to a first embodiment.

FIG. 1 illustrates an image forming system 1. As shown in FIG. 1, the image forming system 1 includes an image forming apparatus 10 and an external terminal 50.

The image forming apparatus 10 and the external terminals 50 are connected to each other via a network 101. The network 101 is configured by, for example, a local area network (LAN) and the Internet. The form of connection to the network 101 may be either wired or wireless. For example, the image forming apparatus 10 is connected by wire to the network 101, whereas the external terminal is wirelessly connected to the network 101.

In the image forming system 1, the external terminal 50 can be used to perform various types of operations on the image forming apparatus 10. In other words, the external terminal 50 can remotely operate the image forming apparatus 10.

Specifically, the image forming apparatus 10 transmits data for displaying an image for use in remote operation (hereinafter, also referred to as a "remote operation image 120") to the external terminal 50. Upon receipt of the display data, the external terminal 50 displays the remote operation image 120 based on the display data on its touch panel 75 (see FIG. 1). This allows a user of the external terminal 50 to remotely operate the image forming apparatus 10 via the remote operation image 120.

1-2. Configuration of Image Forming Apparatus 10

Figure 2:
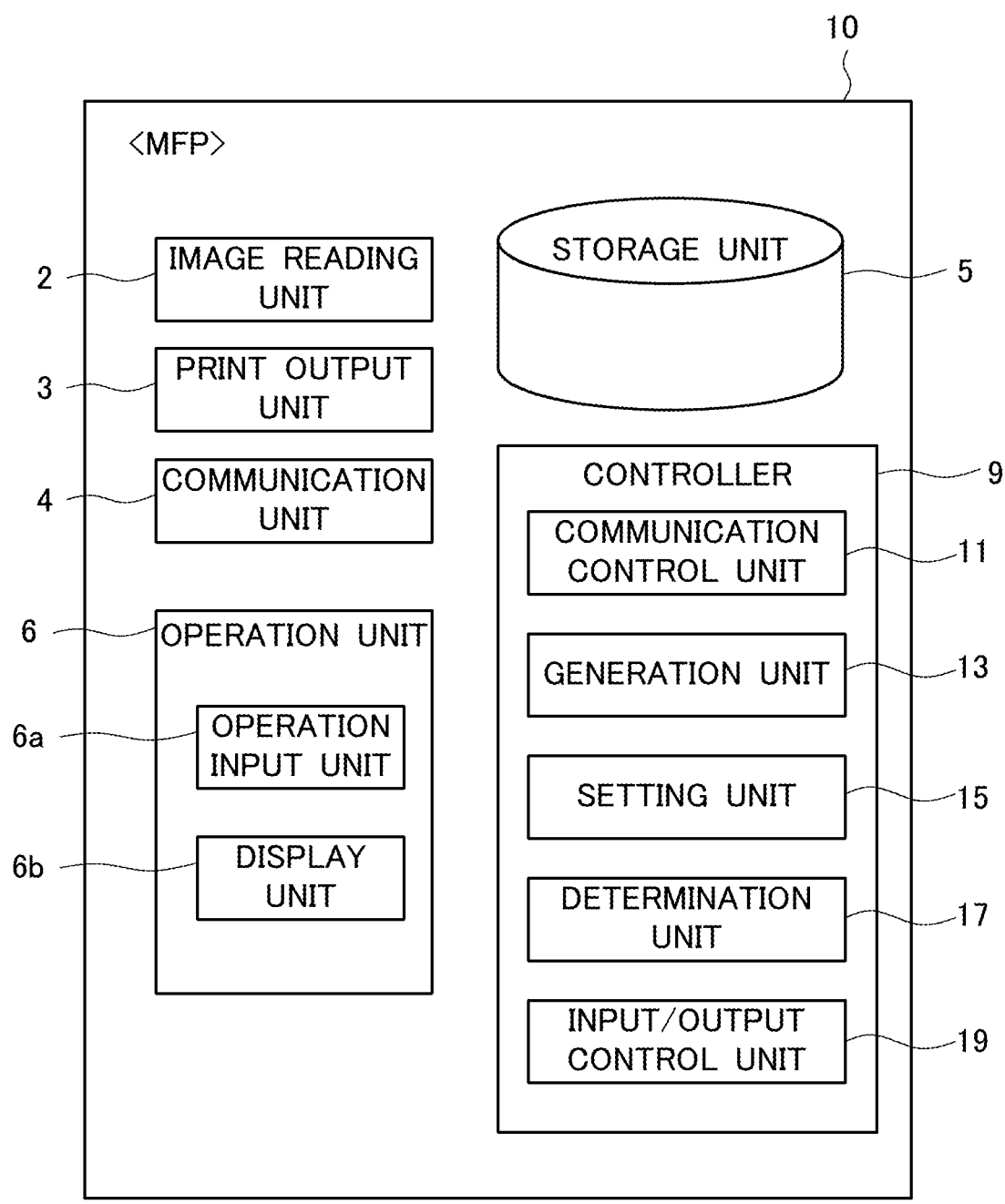
FIG. 2 is a functional block diagram of the image forming apparatus.

FIG. 2 is a functional block diagram of the image forming apparatus 10. Here, a Multi-Functional Peripheral (MFP) is given as an example of the image forming apparatus 10. FIG. 2 shows functional blocks of the MFP 10.

The MFP 10 is an apparatus (also referred to as the "Multi-Functional Peripheral") having functions such as a scan function, a copy function, a facsimile function, and a box storage function. Specifically, the MFP 10 includes, for example, an image reading unit 2, a print output unit 3, a communication unit 4, a storage unit 5, an operation unit 6, and a controller 9 as shown in the functional block diagram of FIG. 2. The MFP 10 implements various types of functions by operating these units in combination.

The image reading unit 2 is a processing unit configured to optically read (i.e., scan) an original document placed at a predetermined position on the MFP 10 and generate image data of the original document (also referred to as an "original image" or a "scanned image"). The image reading unit 2 is also referred to as a "scan unit."

The print output unit 3 is an output unit configured to print out an image on various types of media such as paper on the basis of data to be printed.

The communication unit 4 is a processing unit capable of facsimile communication via a public network or the like. The communication unit 4 is also capable of network communication via the network 101. The network communication uses, for example, various types of protocols such as the transmission control protocol/internet protocol (TCP/IP). Using the network communication allows the MFP 10 to exchange various types of data with desired apparatuses (e.g., the external terminal 50).

The storage unit 5 is configured by a storage device such as a hard disk drive (HDD). The storage unit 5 stores data regarding a print job, for example.

The operation unit 6 includes a manual input unit 6a configured to receive manual input to the MFP 10, and a display unit 6b configured to display and output various types of information. The MFP 10 is provided with a touch screen 25 (see FIG. 1) configured by embedding piezoelectric sensors or the like in a liquid crystal display panel. The touch screen 25 functions as part of the manual input unit 6a and also functions as part of the display unit 6b. The MFP 10 is also provided with a plurality of hardware keys disposed around the touch screen 25. The hardware keys function as part of the manual input unit Ga.

The controller 9 is a control unit built into the MFP 10 and configured to perform overall control of the MFP 10. The controller 9 is configured as a computer system that includes, for example, a CPU and various types of semiconductor memories (a RAM and a ROM). The controller 9 implements various types of processing units by causing the CPU to execute a predetermined software program (hereinafter, also simply referred to as a "program") PG1 stored in a ROM (e.g., an EEPROM). Note that the program (specifically, a group of program modules) PG1 may be installed on the MFP 10 using a portable recording medium such as a USB memory (in other words, various types of computer-readable non-transitory recording media) or via the network 101 or the like.

Specifically, the controller 9 implements various types of processing units including a communication control unit 11, a generation unit 13, a setting unit 15, a determination unit 17, and an input/output control unit 19 by executing the program PG1.

The communication control unit 11 is a processing unit configured to control communication with other apparatuses (e.g., the external terminal 50). Specifically, the communication control unit 11 includes a transmission unit and a reception unit. The transmission unit is configured to transmit the data for displaying the remote operation image 120 to the external terminal 50. The reception unit is configured to receive information MI on manual input to the remote operation image 120 (hereinafter, also referred to as "manual input information MI").

The generation unit 13 is a processing unit configured to generate the remote operation image 120 to be transmitted to the external terminal 50.

The setting unit 15 is a processing unit configured to set a non-sensitive area (hereinafter, also referred to as a "dead area") DA in which manual input by an operator is not received, within the remote operation image 120.

The determination unit 17 is a processing unit configured to determine a content of manual input by the operator of the external terminal 50 on the basis of the manual input information MI.

The input/output control unit 19 is a processing unit configured to control display on the touch screen 25 and manual input to the touch screen 25.

1-3. Configuration of External Terminal 50

Next is a description of the configuration of the external terminal 50.

The external terminal 50 is an information input/output terminal apparatus capable of network communication with other apparatuses. Here, a tablet terminal is given as an example of the external terminal 50. The present invention is, however, not limited to this example, and the external terminal 50 may be any other apparatus such as a smartphone or a personal computer. The external terminal 50 may be a portable apparatus or a stationary apparatus.

Figure 3:
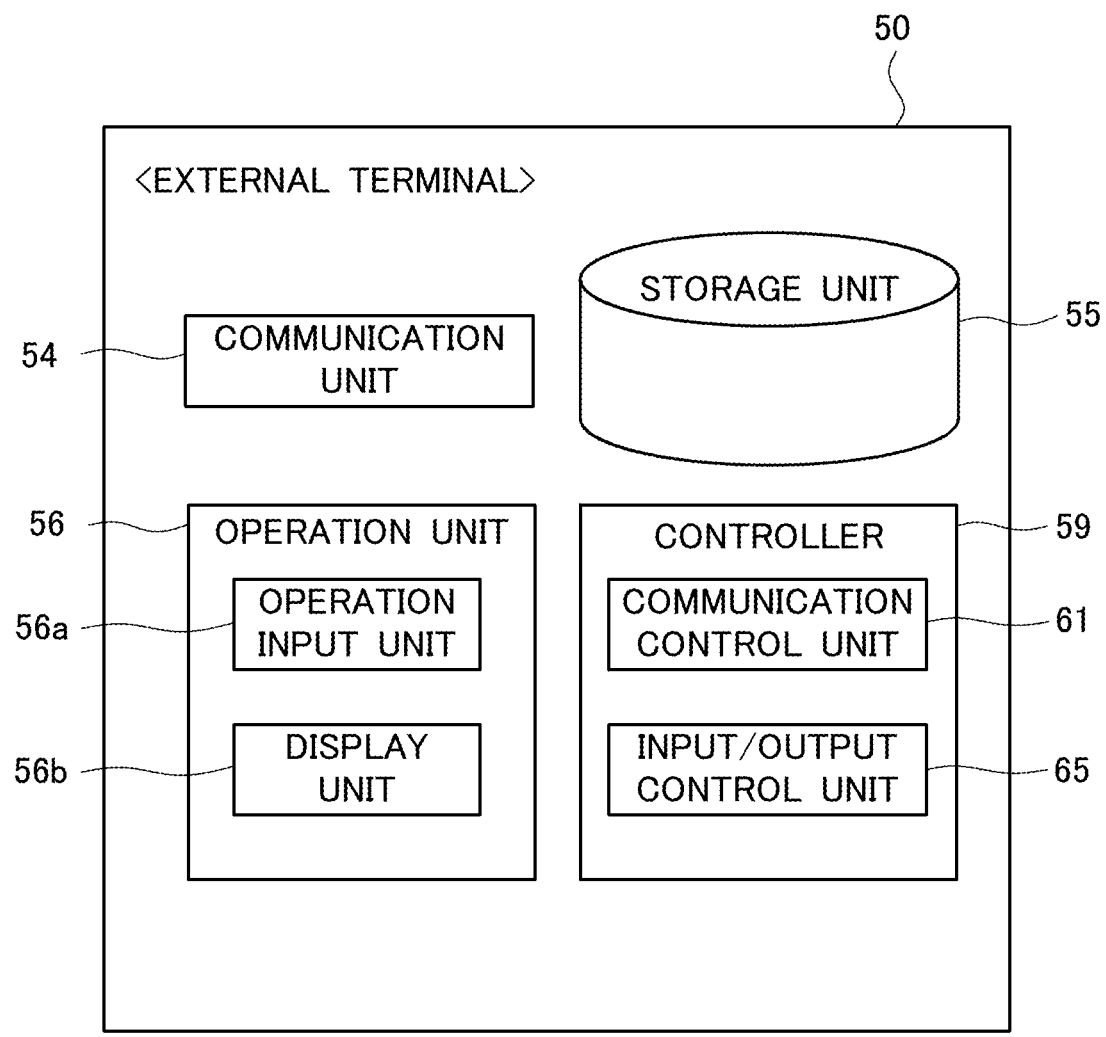
FIG. 3 is a functional block diagram of an external terminal.

FIG. 3 is a functional block diagram showing a schematic configuration of the external terminal 50.

The external terminal 50 includes, for example, a communication unit 54, a storage unit 55, an operation unit 56, and a controller 59 as shown in the functional block diagram of FIG. 3. The external terminal 50 implements various types of functions by operating these units in cooperation.

The communication unit 54 is capable of network communication via the network 101. The network communication uses, for example, various types of protocols such as the transmission control protocol/internet protocol (TCP/IP). Using the network communication allows the external terminal 50 to exchange various types of data with desired apparatuses (e.g., the image forming apparatus 10).

The storage unit 55 is configured by a storage device such as a nonvolatile semiconductor memory.

The operation unit 56 includes a manual input unit 56a configured to receive manual input to the external terminal 50, and a display unit 56b configured to display and output various types of information. The external terminal 50 is provided with a touch screen 75 (see FIG. 1) configured by embedding piezoelectric sensors or the like in a liquid crystal display panel. The touch screen 75 functions as part of the manual input unit 56a and also functions as part of the display unit 56b.

The controller 59 is a control unit built into the external terminal 50 and configured to perform overall control of the external terminal 50. The controller 59 is configured as a computer system that includes, for example, a CPU and various types of semiconductor memories (a RAM and a ROM). The controller 59 implements various types of processing units by causing the CPU to execute a predetermined software program (hereinafter, also simply referred to as a "program") PG2 stored in a memory unit (e.g., a semiconductor memory). Note that the program PG2 may be installed on the external terminal 50 using a portable recording medium such as a USB memory (in other words, various types of computer-readable non-transitory recording media) or via the network 101 or the like.

The program PG2 is application software for remotely operating the image forming apparatus 10 and implements various functions regarding remote operations.

Specifically, the controller 59 executes the program PG2 to implement various types of processing units including a communication control unit 61 and an input/output control unit 65 as shown in FIG. 3.

The communication control unit 61 is a processing unit configured to control communication with the image forming apparatus 10 or the like in cooperation with, for example, the communication unit 54. Specifically, the communication control unit 61 includes a transmission unit and a reception unit. The transmission unit is configured to transmit the manual input information MI on manual input to the remote operation image 120 toward the MFP 10. The reception unit is configured to receive the data for displaying the remote operation image 120 from the MFP 10.

The input/output control unit 65 is a processing unit configured to control display on the display unit 56b (e.g., the touch screen 75) and manual input to the manual input unit 56a (e.g., the touch screen 75).

1-4. Operation

Figure 4:
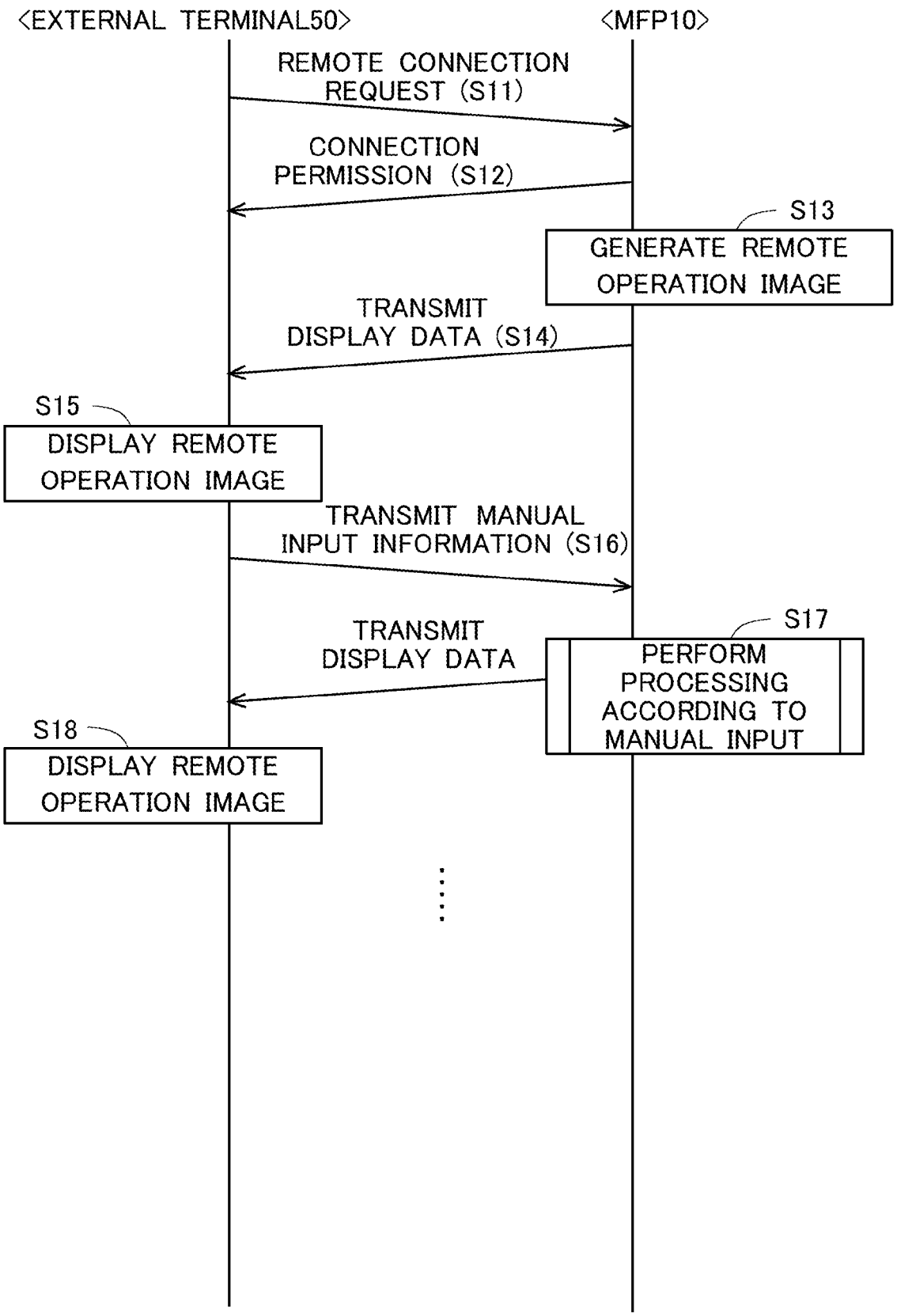
FIG. 4 is a sequence diagram of operations performed in an image forming system.

Next is a description of operations performed in the image forming system 1 FIG. 4 is a sequence diagram showing these operations.

First, the external terminal 50 starts up the program PG2 for remote operations and requests the MFP 10 to establish remote connection (step S11). In response to the remote connection request, the MFP 10 transmits permission for connection to the external terminal 50 (step S12). This establishes connection between the MFP 10 and the external terminal 50.

When the connection has been established between the MFP 10 and the external terminal 50, the generation unit 13 of the MFP 10 generates an initial remote operation image 120 (121) (step S13). Specifically, the generation unit 13 generates, as the initial remote operation image 120 (121), a composite image 601 by combining an operation screen image 211 (see FIG. 10) corresponding to the operation screen of the MFP 10 and a display instruction key image 261 (see FIG. 10).

When the composite image 601 has been generated, the communication control unit 11 of the MFP 10 transmits image data DT1 of the composite image 601 to the external terminal 50 as data for displaying the remote operation image 121 (step S14).

In response to this, the communication control unit 61 of the external terminal 50 receives the image data DT1 of the composite image 601 from the MFP 10. Then, the input/output control unit 65 of the external terminal 50 displays the composite image 601 based on the image data DT1 as the initial remote operation image 121 on the touch panel 75 (see FIG. 10).

Figure 10:
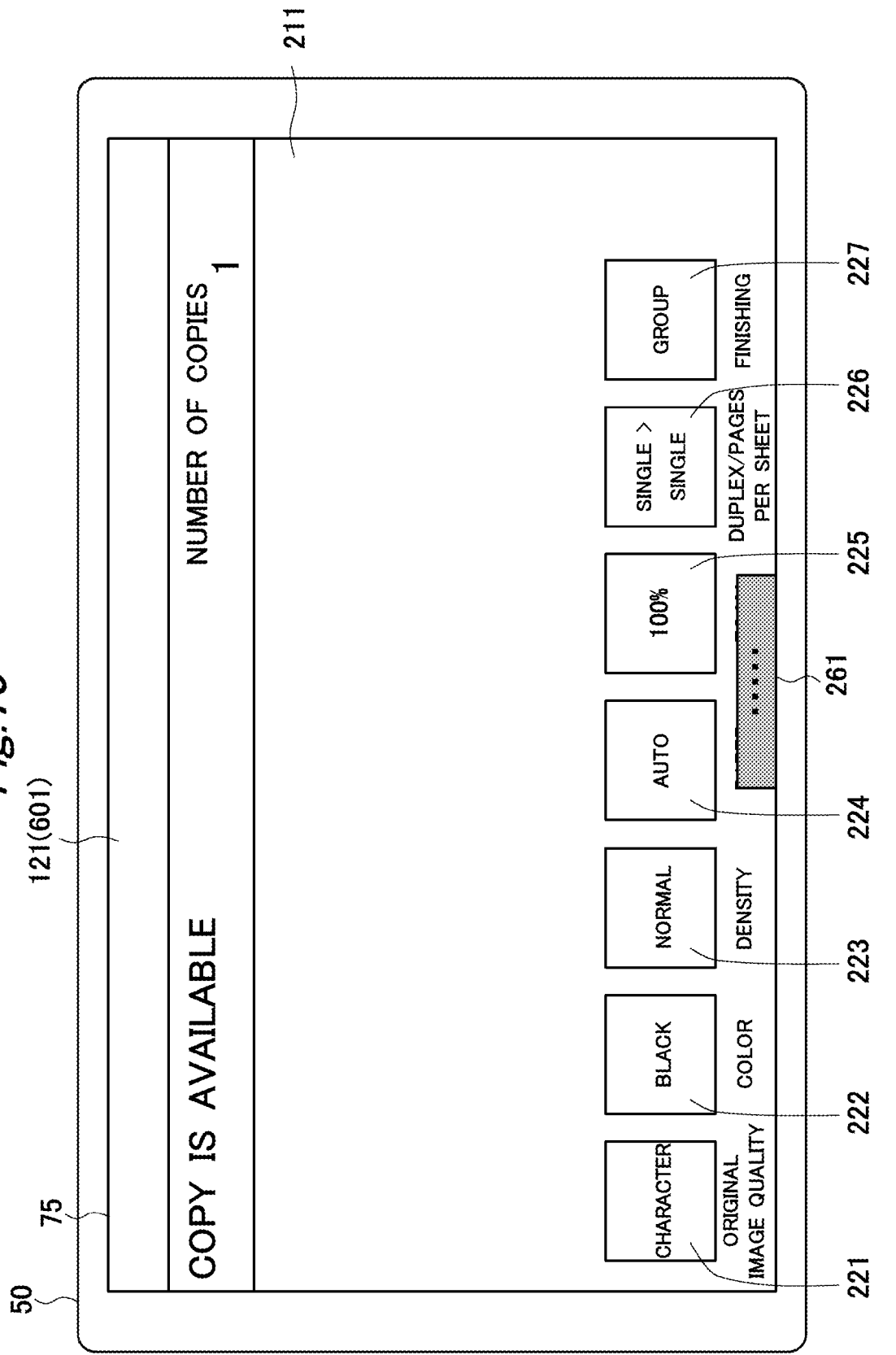
FIG. 10 illustrates a remote operation image displayed on the external terminal.

As shown in FIG. 10, the operation screen image 211 is an image corresponding to the operation screen of the MFP 10 (i.e., an image depicting the operation screen displayed on the touch screen 25 of the MFP 10). The operation screen image 211 includes a plurality of software keys 221 to 227 horizontally arranged in the lower part of the operation screen image 211. The software keys 221 to 227 function respectively as keys for receiving display instructions to display setting screens 111 to 117 (not shown) for setting items ("Original Image Quality," "Color," "Density," "Paper," "Zoom," "Duplex/Pages per Sheet," "Finishing") of the MFP 10. The software keys 221 to 227 are also respectively referred to as call keys (also called "call key images") 221 to 227 as they receive instructions (display instructions) to call the setting screens 111 to 117 (not shown). Note that the software keys 221 to 227 each display the current setting of the setting item within its area (in its interior area on the screen surface). For example, the software key 221 displays the current setting "Character" of the setting item "Original Image Quality" within its area, and the software key 222 displays the current setting "Black" of the setting item "Color" within its area. Similarly, the other software keys 223 to 227 also display the current settings of the setting items within their areas.

The display instruction key image 261 shown in FIG. 10 is a key image for receiving a display instruction to display a hardware key area image 230 (see FIG. 13), which will be described later.

When the external terminal 50 has accepted manual input by an operator via the remote operation image 121 shown in FIG. 10, the communication control unit 61 of the external terminal 50 transmits manual input information MI on that manual input to the MFP 10 (step S16 in FIG. 4). The manual input information MI includes status information as to whether or not there is a finger or hand touch on the touch panel 75 (a "contact state" or a "non-contact state") and coordinate information on the coordinates of the position at which manual input is received in the remote operation image 121. Here, a situation is assumed in which there is manual input to the software key 222 in the remote operation image 121 and the manual input information MI including the coordinates of the position of the software key 222 is transmitted from the external terminal 50 to the MFP 10.

Figure 5:
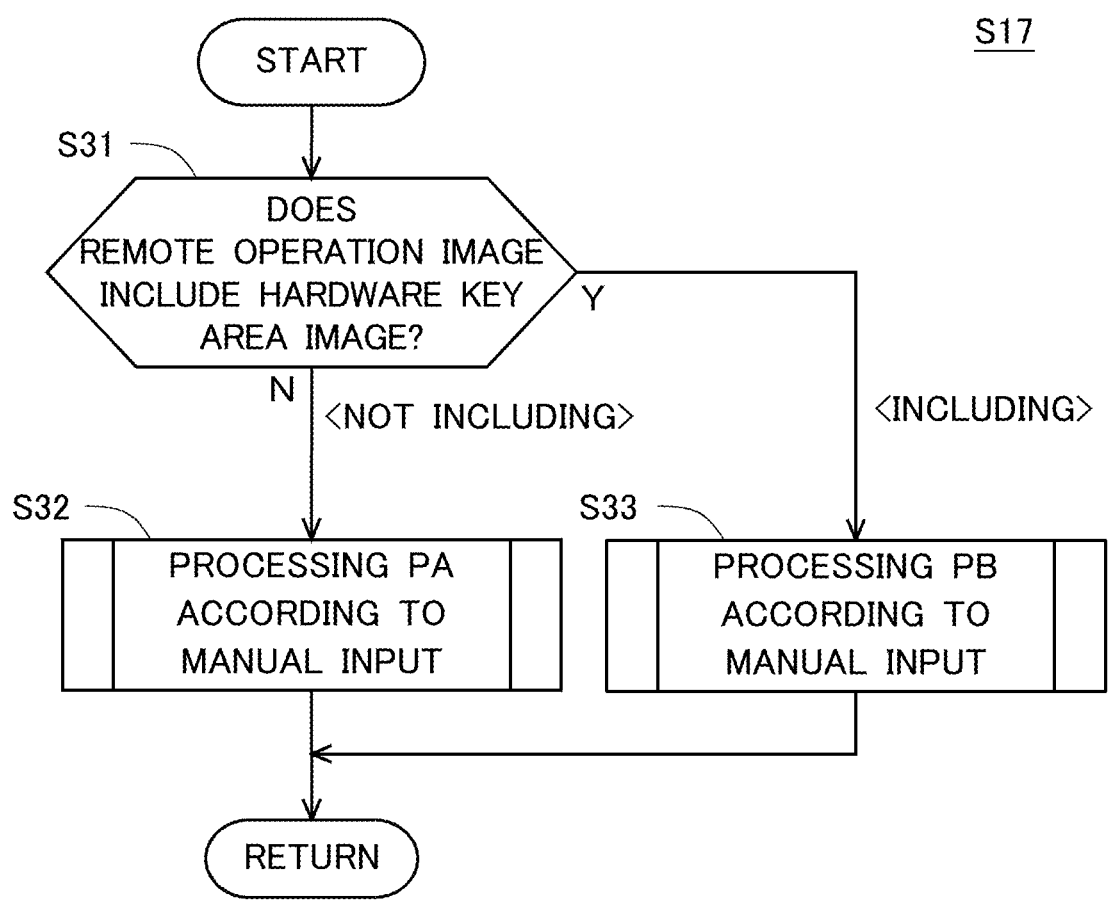
FIG. 5 is a flowchart of operations performed by the image forming apparatus.

In response to this, the communication control unit 11 of the MFP 10 receives the manual input information MI from the external terminal 50. Then, the MFP 10 performs processing according to the manual input on the basis of the manual input information MI (step S17). Specifically, the MFP 10 performs processing shown in the flowchart of FIG. 5. FIG. 5 is a flowchart showing the details of processing performed in step S17 in FIG. 4.

First, in step S31, the MFP 10 determines whether or not the remote operation image 121 (see FIG. 10) on which manual input is made includes the hardware key area image 230. In the present example, it is determined that the remote operation image 121 does not include the hardware key area image 230, and the processing proceeds to step S32. If it is determined that the remote operation image 120 includes the hardware key area image 230, the processing proceeds to step S33. The details of processing of step S33 will be described later.

Figure 6:
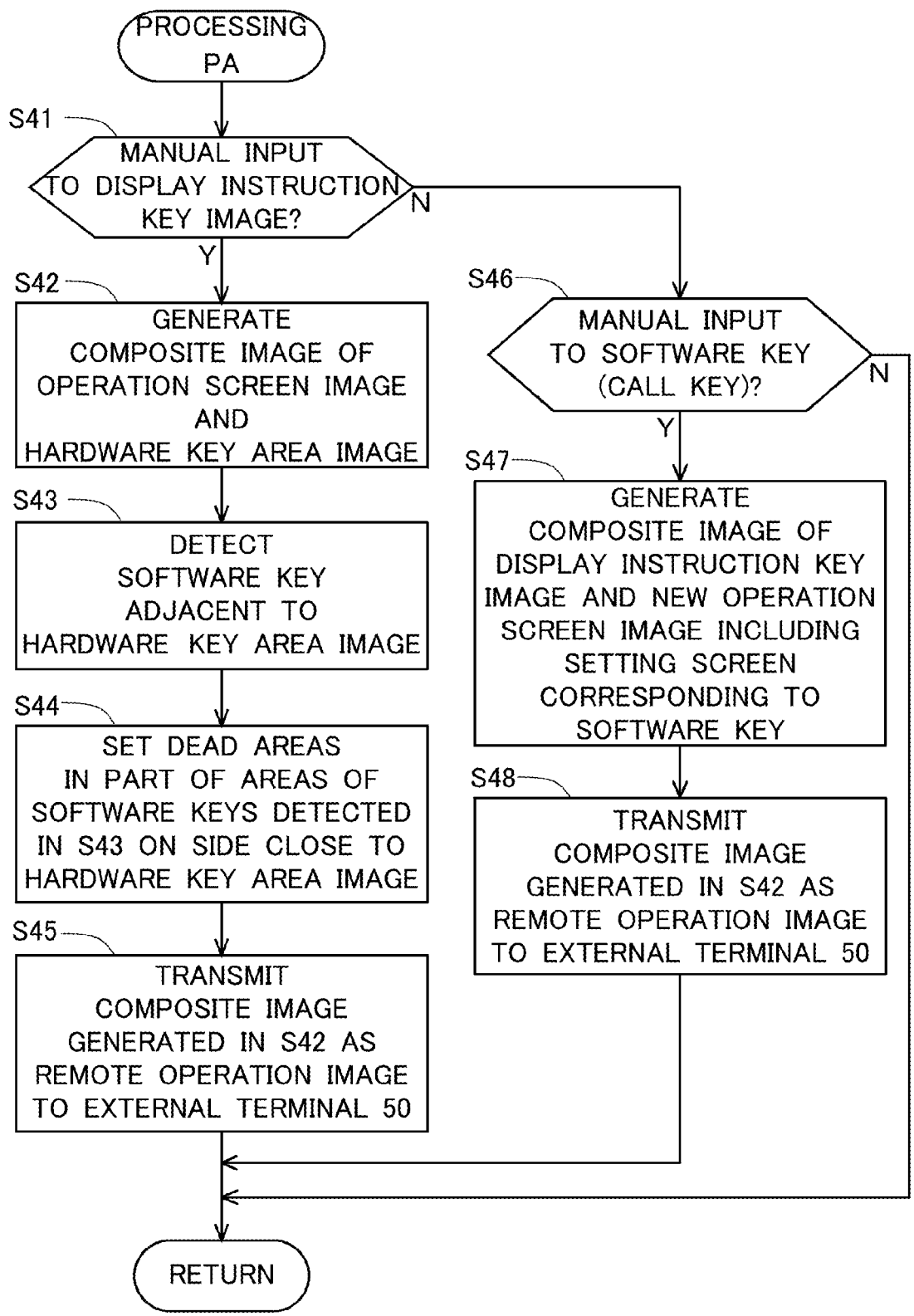
FIG. 6 is a flowchart of operations performed by the image forming apparatus.

In step S32, the MFP 10 performs processing (hereinafter, also referred to as "processing PA") according to the manual input to the touch panel 75 of the external terminal 50. Specifically, the MFP 10 performs processing shown in the flowchart of FIG. 6. FIG. 6 is a flowchart showing the details of processing performed in step S32 in FIG. 5.

First, in step S41, the MFP 10 determines on the basis of the manual input information MI whether or not there is manual input to the display instruction key image 261. If it is determined that there is manual input to the display instruction key image 261, the processing proceeds to step S42. On the other hand, if it is determined that there is no manual input to the display instruction key image 261, the processing proceeds to step S46. The present example assumes a situation in which there is manual input to the software key 222. Thus, it is determined that there is no manual input to the display instruction key image 261, and the processing proceeds from step S41 to step S46.

In step S46, the MFP 10 determines on the basis of the manual input information MI whether or not there is manual input to one of the software keys 221 to 227. If it is determined that there is manual input to one of the software keys 221 to 227, the processing proceeds to step S47. On the other hand, if it is determined that there is manual input to any of the software keys 221 to 227, the processing PA ends. The present example assumes a situation in which there is manual input to the software key 222. Thus, the processing proceeds from step S46 to step S47.

Figure 11:
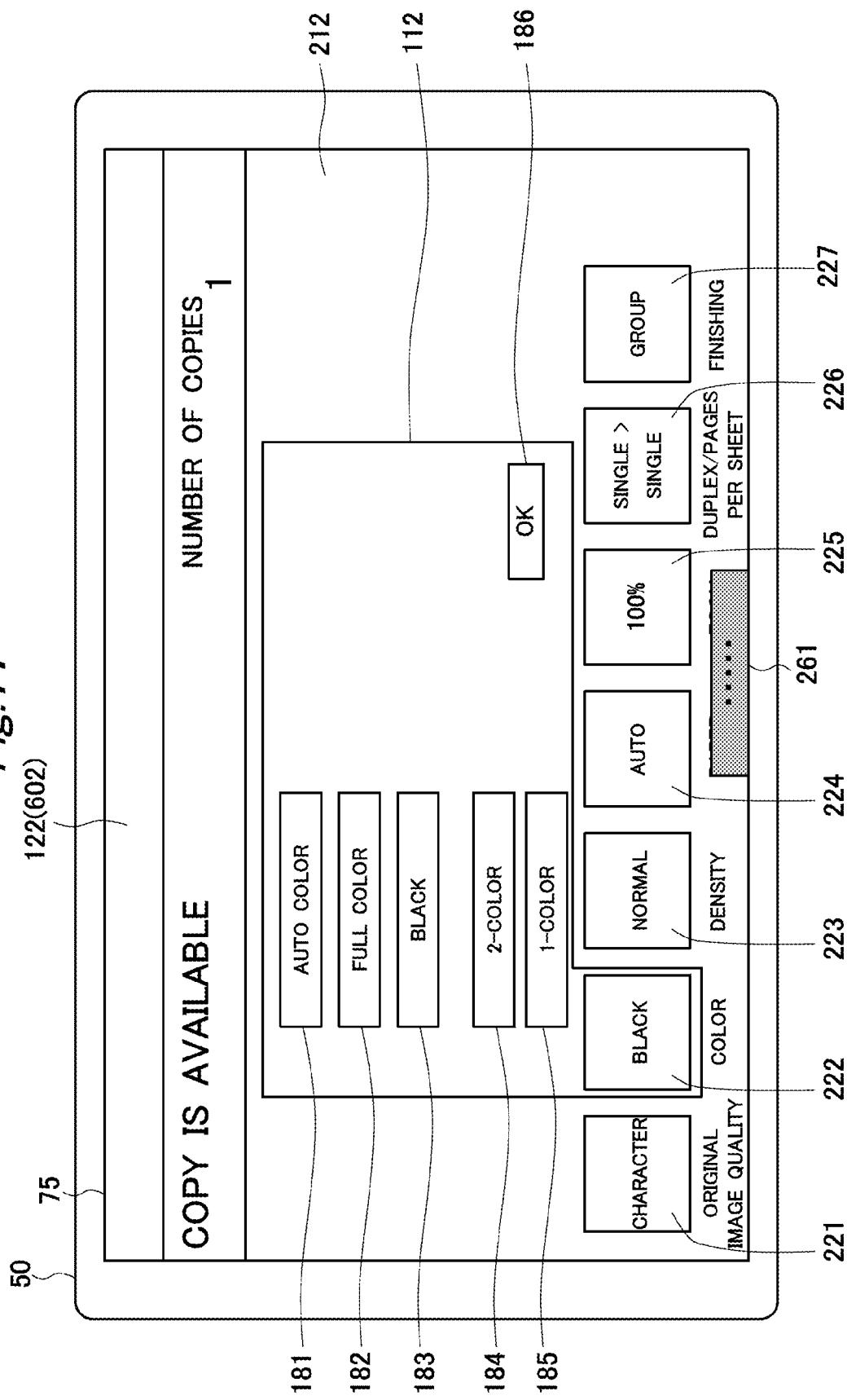
FIG. 11 illustrates a remote operation image displayed on the external terminal.

In step S47, the generation unit 13 of the MFP 10 generates a composite image 602 as a remote operation image 120 (122) by combining the display instruction key image 261 and a new operation screen image 212 (see FIG. 11).

As shown in FIG. 11, the operation screen image 212 is an image in which the setting screen 112 corresponding to the software key 222 is displayed over the operation screen image 211 (see FIG. 10).

The setting screen 112 within the operation screen image 212 includes a plurality of buttons 181 to 186. Each button 180 (181 to 185) is for selecting one of settings ("Auto Color," "Full Color," "Black," "2-Color," and "1-Color") of the setting item "Color." The button 186 is for confirming the setting selected via one of the buttons 181 to 185.

In step S48 in FIG. 6, the MFP 10 transmits image data DT2 of the composite image 602 generated in step S47 to the external terminal 50 as data for displaying the remote operation image 122.

In response to this, the communication control unit 61 of the external terminal 50 receives the image data DT2 of the composite image 602. Then, the input/output control unit 65 of the external terminal 50 displays the composite image 602 based on the image data DT2 as the remote operation image 122 on the touch panel 75 as shown in FIG. 11 (step S18 in FIG. 4).

If there is manual input thereafter via the remote operation image 120 (e.g., 122), the above-described processing of steps S16 to S18 in FIG. 4 is performed again.

Here, a situation is assumed in which the button 182 is selected and then the button 186 is pressed in the setting screen 112 within the remote operation image 122, as a result of which the setting of the setting item "Color" is changed from "Black" to "Full Color."

Figure 12:
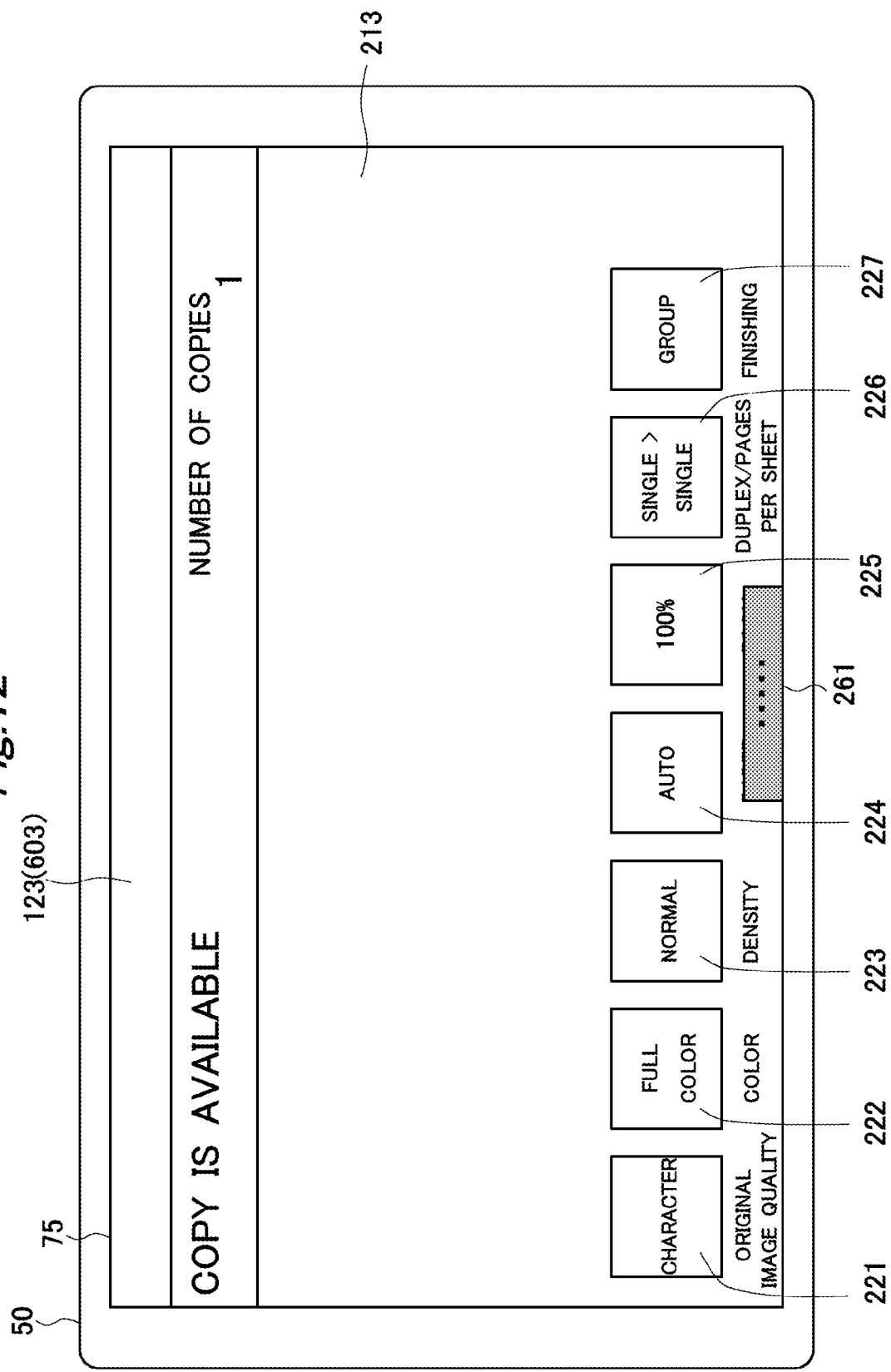
FIG. 12 illustrates a remote operation image displayed on the external terminal.

Specifically, the manual input information MI on the manual input to the remote operation image 122 (see FIG. 11) (i.e., information including the status information "contact state" and the contact position (the coordinates of the position of the button 182)) is transmitted from the external terminal 50 to the image forming apparatus 10 (step S16). Then, the MFP 10 generates a composite image 603 (see FIG. 12) by combining a new operation screen image 213 and the display instruction key image 261 and transmits image data DT3 of the composite image 603 to the external terminal 50 as data for displaying a remote operation image 123 (step S17). In response to this, the external terminal 50 displays the composite image 603 based on the image data DT3 as the remote operation image 123 on the touch panel 75 as shown in FIG. 12 (step S18). The operation screen image 213 is an image in which the setting displayed in the area of the software key 222 in the operation screen image 211 is changed from "Black" (see FIG. 10) to "Full Color" (see FIG. 12).

If there is manual input to the display instruction key image 261 thereafter via the remote operation image 123 shown in FIG. 12, the MFP 10 again performs the above-described processing of steps S16 to S18 shown in FIG. 4.

Specifically, when there is manual input to the display instruction key image 261, the communication control unit 61 of the external terminal 50 transmits the manual input information MI including the coordinates of the position at which the manual input to the remote operation image 123 is made (here, the coordinates of the position of the display instruction key image 261) to the MFP 10 (step S16).

In response to this, the communication control unit 11 of the MFP 10 receives the manual input information MI from the external terminal 50. The MFP 10 then performs processing according to the manual input (the processing shown in the flowchart of FIG. 5) on the basis of the manual input information MI (step S17).

First, in step S31 in FIG. 5, the MFP 10 determines whether or not the remote operation image 123 includes the hardware key area image 230. In the present example, it is determined that the remote operation image 123 does not include the hardware key area image 230, and the processing proceeds to step S32.

In step S32, the MFP 10 performs the processing PA (the processing shown in the flowchart of FIG. 6).

First, in step S41 in FIG. 6, the MFP 10 determines whether or not there is manual input to the display instruction key image 261. In the present example assumes a situation in which it is determined that there is manual input to the display instruction key image 261. Thus, the processing proceeds from step S41 to step S42.

In step S42, the generation unit 13 of the MFP 10 generates a composite image 604 as a remote operation image 120 (124) (see FIG. 13) by combining the aforementioned operation screen image 213 and the hardware key area image 230.

Figure 13:
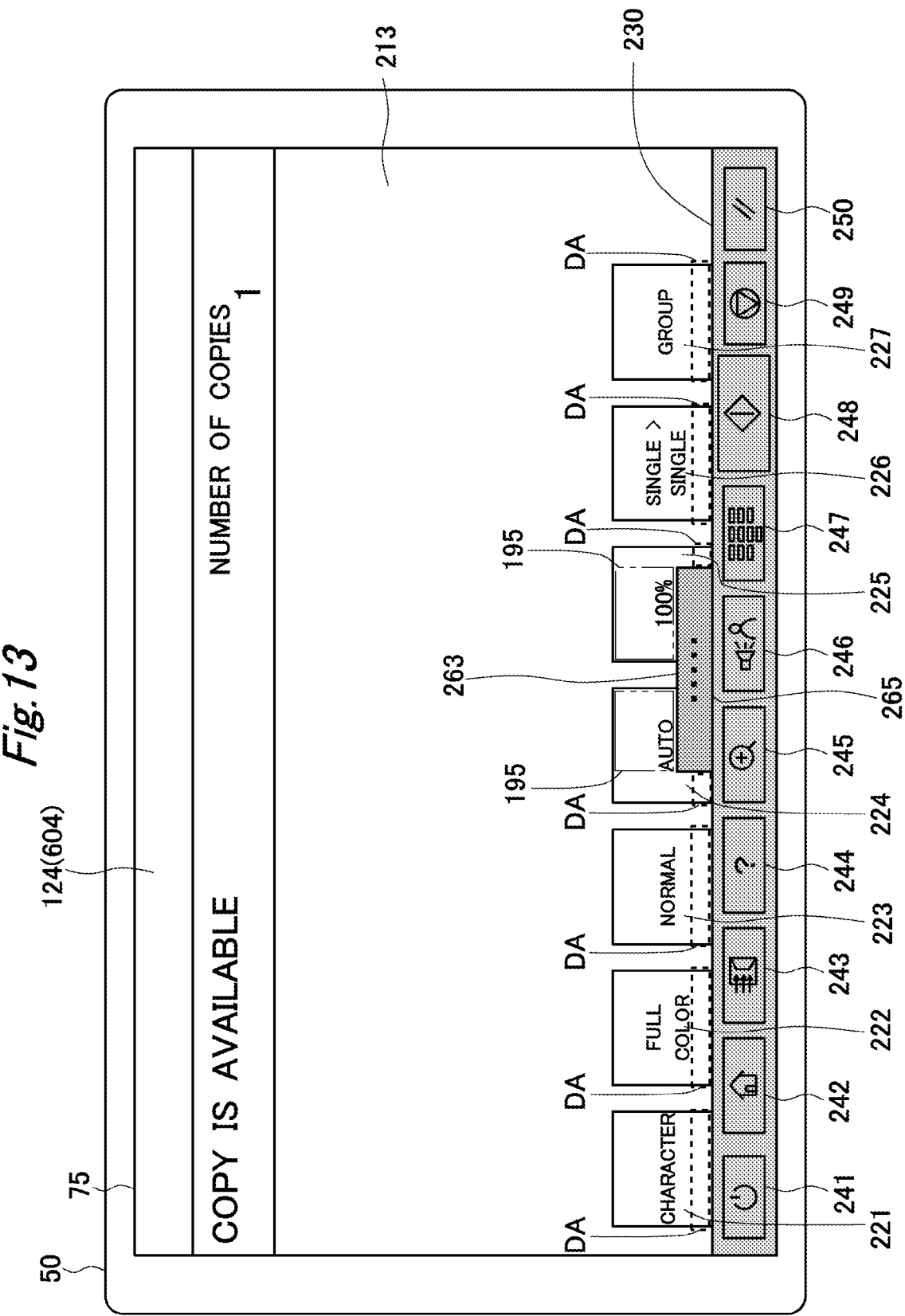
FIG. 13 illustrates a remote operation image displayed on the external terminal.

As shown in FIG. 13, the hardware key area image 230 is an image of an area in which a plurality of hardware key images 241 to 250 are displayed. The hardware key images 241 to 250 correspond respectively to hardware keys of the MFP 10.

Specifically, the hardware key images 241 to 246 correspond respectively to hardware keys "Power," "Menu," "Interrupt," "Guide," "Enlargement," and "Audio Guide" of the MFP 10, and the hardware key image 247 corresponds to 10 numeric keys (also referred to as a "numeric keypad") of the MFP 10. The hardware key images 248 to 250 correspond respectively to hardware keys "Start," "Stop," and "Reset" of the MFP 10.

As shown in FIG. 13, the hardware key area image 230 has a substantially rectangular projection portion 265 that projects toward the operation screen image 213 at part of the boundary between the operation screen image 213 and the hardware key area image 230. The projection portion 265 functions as a non-display instruction key image for receiving a non-display instruction to hide the hardware key area image 230.

In step S43 in FIG. 6, the MFP 10 detects software keys 220 that are adjacent to the hardware key area image 230 as target keys in which a dead area DA is to be set, from among software keys 221 to 227 within the remote operation image 124 (see FIG. 13).

Here, software keys 220 on which the hardware key area image 230 is partially superimposed are detected as the software keys adjacent to the hardware key area image 230. To be more specific, all of the software keys 221 to 227 over part of which the hardware key area image 230 is displayed as shown in FIG. 13 are detected as target keys in which the dead area DA is to be set.

The present invention is, however, not limited to this example, and for example, software keys 220 that are spaced from the hardware key area image 230 (e.g., software keys 220 whose shortest distances from the hardware key area image 230 are less than or equal to a predetermined value (approximately several millimeters)) may be detected as the software keys 220 adjacent to the hardware key area image 230.

In step S44 in FIG. 6, the setting unit 15 of the MFP 10 sets the dead area DA in the areas of the target keys (the software keys 221 to 227) detected in step S43. Specifically, the setting unit 15 sets the dead area DA in parts of the areas of the software keys 221 to 227 on the side close to the hardware key area image 230 (here, in the areas ranging from the boundary between the hardware key area image 230 and the software keys (i.e., the boundary under the software keys 220) to positions approximately 2 millimeters above the boundary).

However, as shown in FIG. 13, the setting unit 15 sets no dead areas DA in areas 195 of the software keys 224 and 225 on which the projection portion 265 is superimposed, the areas 195 facing a long side 263 of the substantially rectangular projection portion 265 on the projection side.

The setting unit 15 also sets no dead areas DA within the hardware key images 241 to 250 in the hardware key area image 230 as shown in FIG. 13.

In step S45 in FIG. 6, the communication control unit 11 of the MFP 10 transmits image data DT4 of the composite image 604 generated in step S42 to the external terminal 50 as data for displaying the remote operation image 124.

In response to this, the communication control unit 61 of the external terminal 50 receives the image data DT4 of the composite image 604 from the MFP 10. Then, the input/output control unit 65 of the external terminal 50 displays the composite image 604 based on the image data DT4 as the remote operation image 124 on the touch panel 75 as shown in FIG. 13 (step S18 in FIG. 4).

If any software key 220 among the software keys 221 to 227 is touched thereafter via the remote operation image 124 shown in FIG. 13, the processing of step S16 and onward in FIG. 4 is performed again. The present example assumes a situation in which the software key 222 is touched in the remote operation image 124.

In step S16 in FIG. 4, the external terminal 50 transmits manual input information MI on the manual input to the remote operation image 124 to the MFP 10.

In step S17, the MFP 10 performs the processing shown in the flowchart of FIG. 5.

First, in step S31 in FIG. 5, the MFP 10 determines whether or not the remote operation image 124 includes the hardware key area image 230. In the present example, it is determined that the remote operation image 124 includes the hardware key area image 230, and the processing proceeds to step S33.

Figure 7:
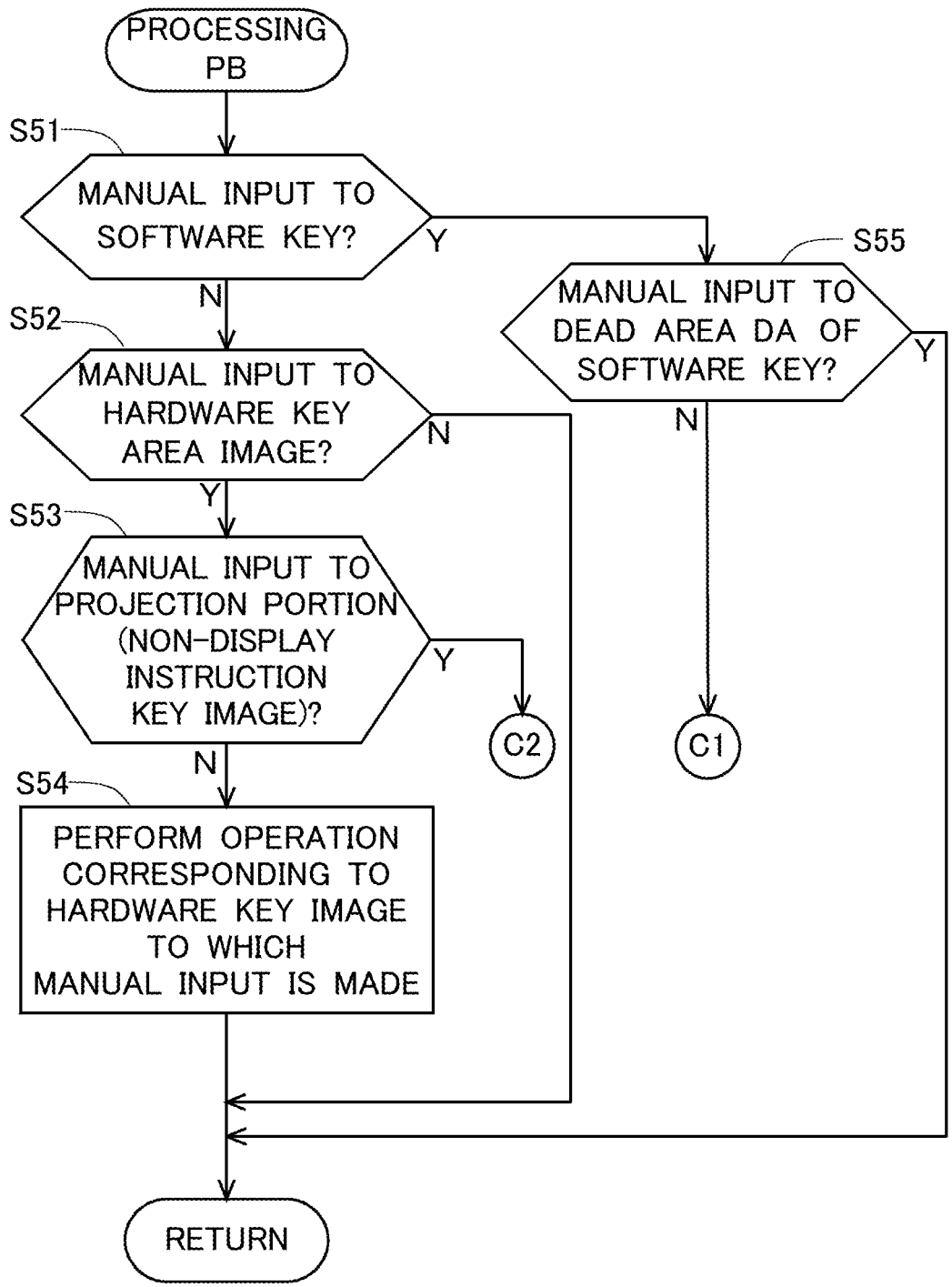
FIG. 7 is a flowchart of operations performed by the image forming apparatus.

In step S33, the MFP 10 performs processing (hereinafter, also referred to as "processing PB") according to the manual input to the remote operation image 124. Specifically, the MFP 10 performs processing shown in the flowchart of FIG. 7. FIG. 7 is a flowchart showing the details of processing performed in step S33 in FIG. 5.

First, in step S51 in FIG. 7, the MFP 10 determines on the basis of the manual input information MI whether or not any software key 220 among the software keys 221 to 227 is touched on the external terminal 50. If it is determined that one of the software keys 220 is touched on the external terminal 50, the processing proceeds to step S55, and otherwise the processing proceeds to step S52. The present example assumes a situation in which the software key 222 is touched. Thus, the processing proceeds from step S51 to step S55. Note that the processing also proceeds to step S55 if it is determined that any other software key 220 (221 or 223 to 227) is touched.

In step S55, the MFP 10 determines on the basis of the manual input information MI whether or not the dead area DA of the software key 220 (222) is touched on the external terminal 50.

If it is determined on the basis of the manual input information MI that the dead area DA of the software key 220 (222) has been touched, it is determined that there is no manual input to the software key 220 (222). In other words, it is determined that there is no manual input to the software key 220 (222) even though the software key 220 (222) was touched.

Figure 8:
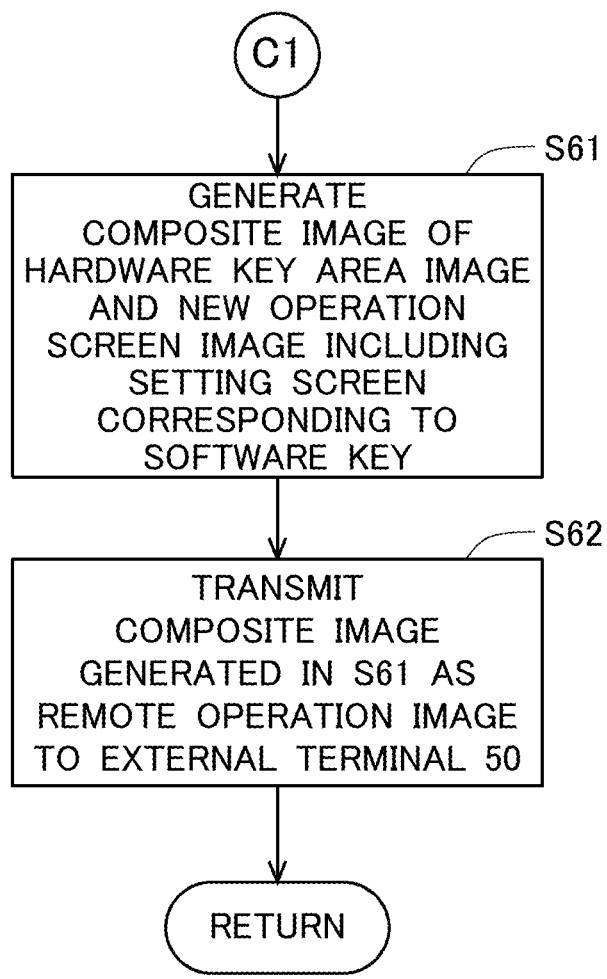
FIG. 8 is a flowchart of operations performed by the image forming apparatus.

On the other hand, if it is determined in step S55 on the basis of the manual input information MI that the area of the software key 220 (222) other than the dead area DA has been touched, it is determined that there is manual input to the software key 220 (222). Then, the MFP 10 performs processing corresponding to the software key 222 (i.e., processing from step S61 onward in FIG. 8). FIG. 8 is a flowchart of processing from step S55 onward in FIG. 7.

Figure 14:
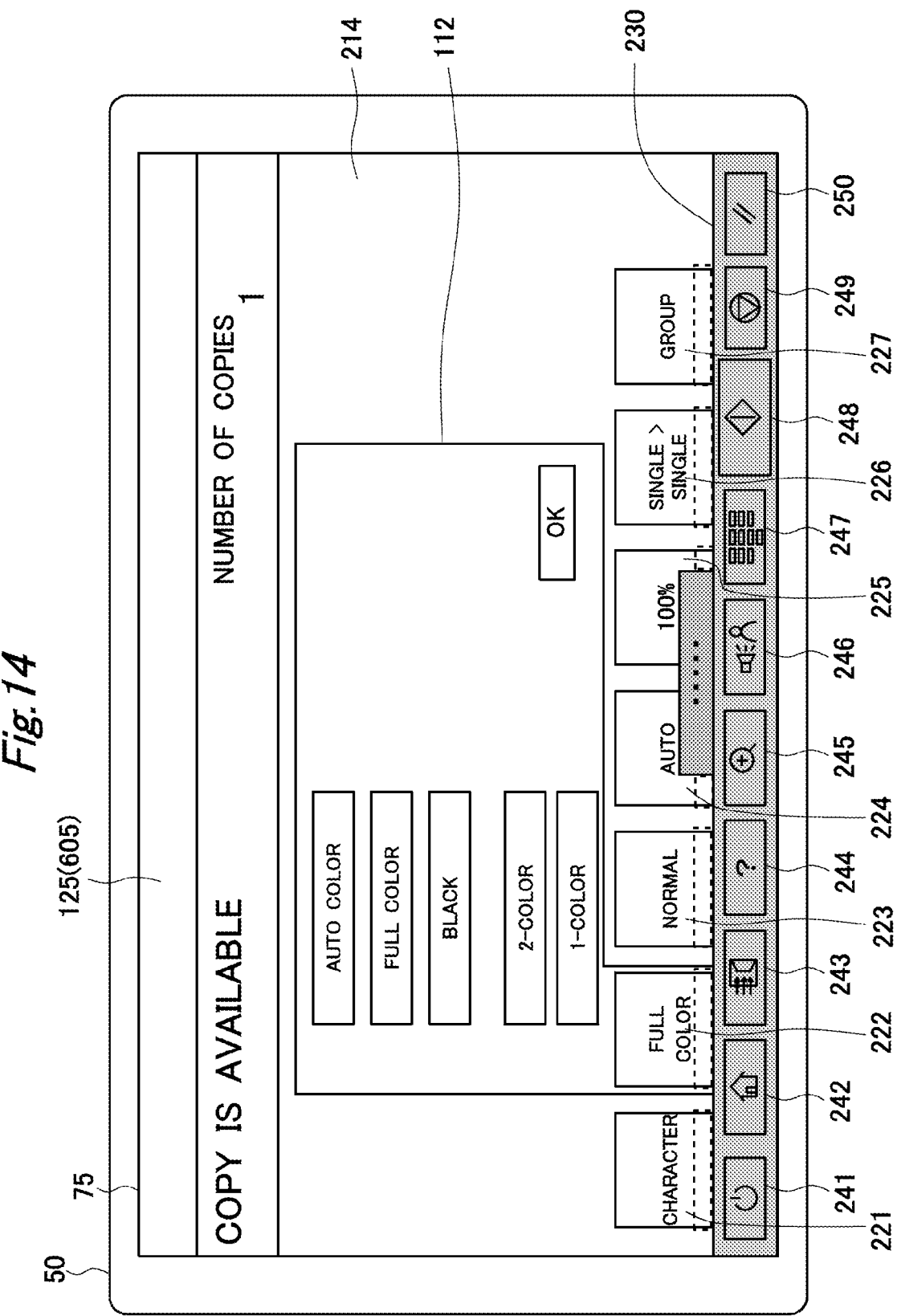
FIG. 14 illustrates a remote operation image displayed on the external terminal.

Specifically, in step S61 in FIG. 8, the generation unit 13 of the MFP 10 generates a composite image 605 (see FIG. 14) by combining a new operation screen image 214 (see FIG. 14) and the hardware key area image 230. The new operation screen image 214 is an image in which the setting screen 112 corresponding to the software key 222 is displayed over the operation screen image 213 (see FIG. 13) (see FIG. 14).

In step S62, the MFP 10 transmits image data DT5 of the composite image 605 generated in step S61 to the external terminal 50 as data for displaying a remote operation image 125. In response to this, the external terminal 50 displays the composite image 605 based on the image data DT5 as the remote operation image 125 on the touch panel 75 (see FIG. 14).

The processing PB (the flowchart of FIG. 7) is also performed when any hardware key image 240 among the hardware key images 241 to 250 is touched via the remote operation image 124 shown in FIG. 13. Below is a description of this processing.

In this case, it is determined in step S51 in FIG. 7 that none of the software keys 221 to 227 has been touched on the external terminal 50. The processing thus proceeds to step S52.

In step S52, the MFP 10 determines whether or not there is manual input to the hardware key area image 230. If it is determined that there is no manual input to the hardware key area image 230, the processing PB ends. On the other hand, if it is determined that there is manual input to the hardware key area image 230, the processing proceeds to step S53.

In step S53, the MFP 10 determines whether or not there is manual input to the projection portion 265.

If it is determined that there is no manual input to the projection portion 265, the processing proceeds to step S54. In step S54, the MFP 10 performs processing corresponding to the hardware key image 242 to which the manual input has been made. Specifically, the MFP 10 generates a remote operation image that includes a "menu screen" corresponding to the hardware key image 242 and performs processing for transmitting the generated remote operation image to the external terminal 50.

Figure 9:
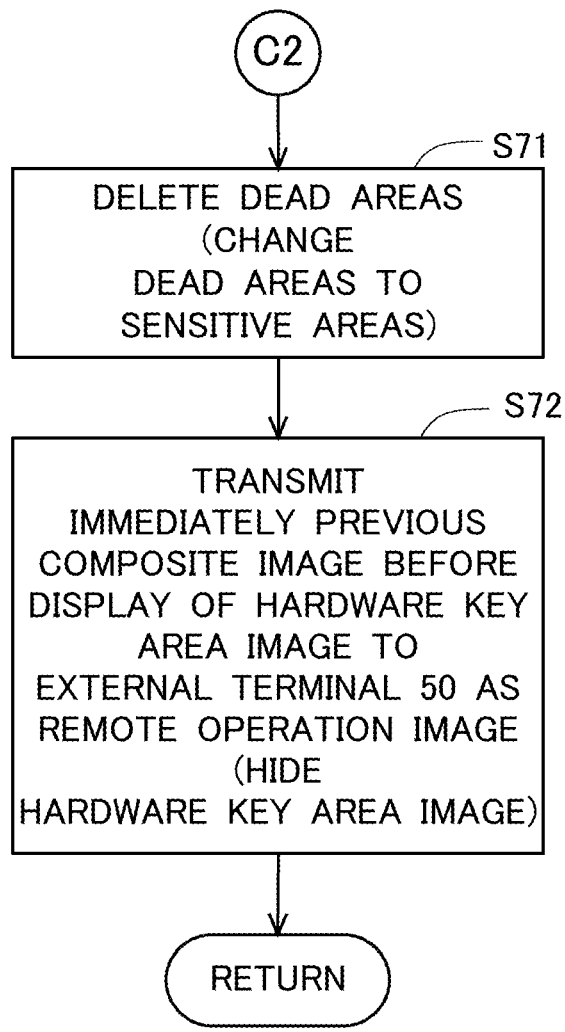
FIG. 9 is a flowchart of operations performed by the image forming apparatus.

On the other hand, if it is determined that there is manual input to the projection portion 265, the MFP 10 performs processing of step S71 and onward in FIG. 9. Specifically, in step S71 in FIG. 9, the MFP 10 deletes the dead areas DA set in the areas of the software keys 221 to 227. In other words, the MFP 10 sets the entire areas of the software keys 221 to 227 to an area (hereinafter, also referred to as a "sensitive area") SA for receiving manual input by an operator.

In step S72, the MFP 10 retransmits the immediately previous composite image 603 before the hardware key area image 230 is displayed over the composite image 603, as the remote operation image 123 toward the external terminal 50. Accordingly, the remote operation image 123 is again displayed on the touch panel 75 of the external terminal 50. In other words, the hardware key area image 230 in the remote operation image 124 (see FIG. 13) is hidden (see FIG. 12).

With the operations described above, in the case of using the composite image 604 of the operation screen image 213 and the hardware key area image 230 as the remote operation image 124 (see FIG. 13), the dead areas DA are set within part of the areas of the software keys 221 to 227, which are adjacent to the hardware key area image 230, on the side close to the hardware key area image 230 (step S44 in FIG. 6). Accordingly, even if the software key 222 disposed close to the hardware key image 242 is operated mistakenly instead of touching the hardware key image 242 in the remote operation image 124, it is determined that the dead area DA of the software key 222 has been touched and accordingly there is no manual input to the software key 222. This makes it possible to prevent mishitting in the area between the hardware key image 242 and the software key 222 adjacent to the hardware key image 242. Similarly, even if any software key 220 (221 to 227) adjacent to any hardware key image 240 (241 and 243 to 250) is operated mistakenly instead of touching the hardware key image, it is determined that the dead area DA of the software key 220 has been touched and accordingly there is no manual input to the software key 220. In this way, with the operations described above, it is possible to prevent mishitting in the area between the software keys 221 to 227 and the hardware key images 241 to 250 even if those keys and images are disposed close to each other.

Here, consider a comparative case in which the technique of Patent Document 1 described above is applied to a screen similar to the remote operation image 124 so that the dead area is set around the entire perimeter of each software key in a software key group and around the entire perimeter of each hardware key image in a hardware key image group. In this case, the following problem arises. Specifically, in this comparative example, the dead areas DA set around the entire perimeter of the software keys 221 to 227 are superimposed on the hardware key images 241 to 250 disposed adjacent to the software key 221 to 227. Also, the dead area DA set around the entire perimeter of each of the hardware key images 241 to 250 is superimposed on another hardware key image 240 that is adjacent to the hardware key image (241 to 250). Consequently, the sensitive areas (the areas in which manual input by an operator can be received) SA of the hardware key images 241 to 250 are undesirably narrowed (reduced in area), making it difficult to receive manual input to the hardware key images and accordingly reducing the operability of the hardware key image group.

In contrast, in the embodiment described above, the dead areas DA are set in parts of the areas of the software keys 221 to 227 on the side close to the hardware key area image 230, and no dead areas DA are set within the hardware key images 241 to 250 in the hardware key area image 230, as shown in FIG. 13. Accordingly, it is possible to ensure excellent operability of the hardware key images 241 to 250.

Additionally, in the embodiment described above, no dead areas DA are set within the areas 195 of the software keys 224 and 225 on which the projection portion 265 is superimposed, the areas 195 facing the long side 263 of the substantially rectangular projection portion 265 on the projection side, as shown in FIG. 13. If the dead areas DA are further set within the areas of the software keys 224 and 225 that have already narrow sensitive areas (areas in which manual input by an operator can be received) SA due to the projection portion 265 being superimposed thereon, the sensitive areas SA become considerably small and accordingly the operability of the software keys 224 and 225 is reduced. In contrast, in the above embodiment in which no dead areas DA are set within the areas 195 of the software keys 224 and 225 that face the long side 263 on the projection side, it is possible to prevent a reduction in the operability of the software keys 224 and 225 due to reduced sensitive areas SA.

2. Second Embodiment

A second embodiment is a variation of the first embodiment. The following description focuses on differences from the first embodiment.

The first embodiment illustrates a case in which no dead areas DA are set in the areas 195 of the software keys 224 and 225 over which the projection portion 265 is superimposed, the areas 195 facing the long side 263 of the projection portion 265 on the projection side, as shown in FIG. 13. In this case, as described above, it is possible to prevent a reduction in the operability of the software keys 224 and 225.

However, if no dead areas DA are set in the areas 195 facing the long side 263 of the projection portion 265 on the projection side, mishitting in the area between the projection portion 265 and the software keys 224 and 225 is more likely to occur. For example, a situation is envisaged in which an operator who intends to touch the projection portion 265 in order to hide the hardware key area image 230 in the remote operation image 124 (see FIG. 13) may mistakenly touch the software key 225 on which the projection portion 265 is superimposed. A situation is also envisaged in which an operator who intends to touch the software key 225 serving as a call key for a setting screen 115 (see FIG. 15) in order to call the setting screen 115 in the remote operation image 124 (see FIG. 13) may mistakenly touch the projection portion 265 superimposed over the software key 225.

In view of this, an image forming system 1 according to the second embodiment performs operations described below when the projection portion 265 or any of the software keys 224 and 225 is mishit, thereby making the transition to the desired screen or the like (recovery operation) relatively easy.

Figure 16:
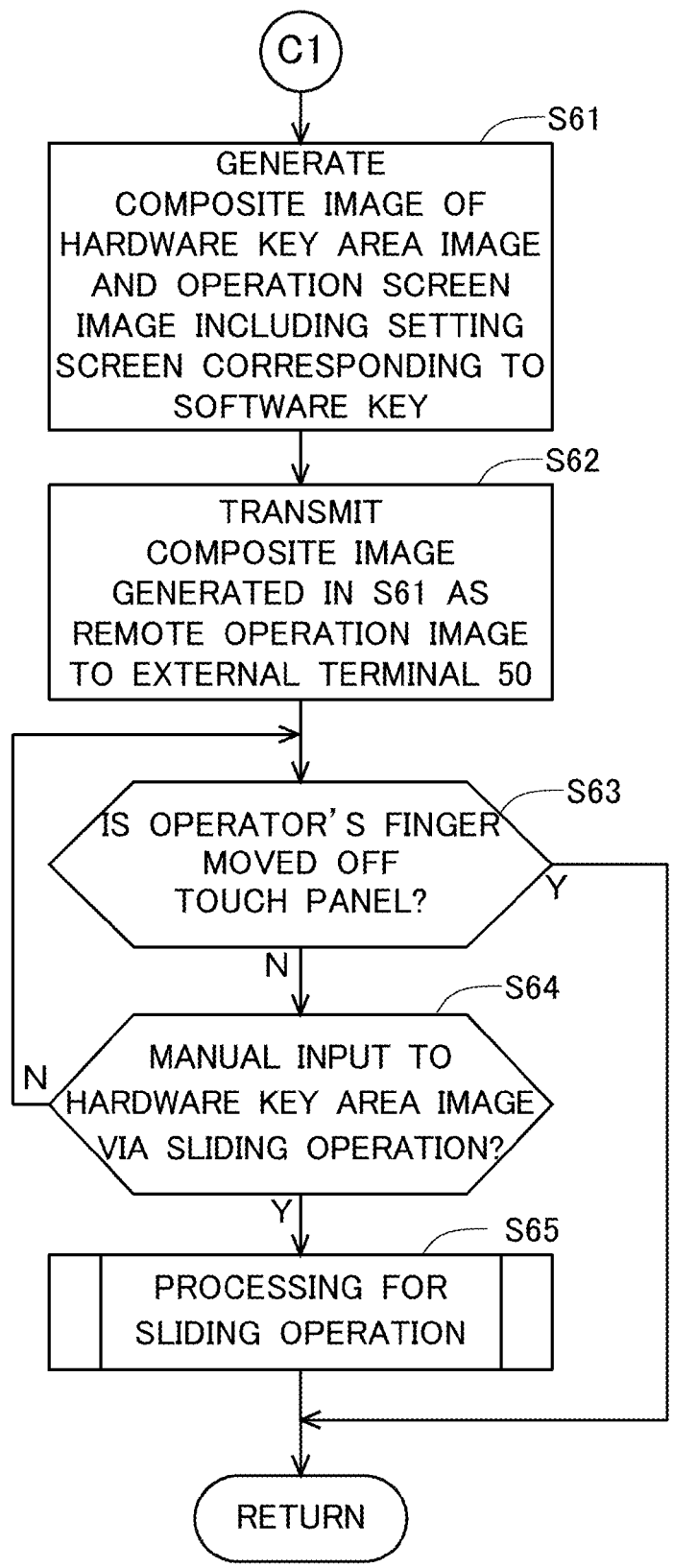
FIG. 16 is a flowchart of operations performed by an image forming apparatus according to a second embodiment.
Figure 18:
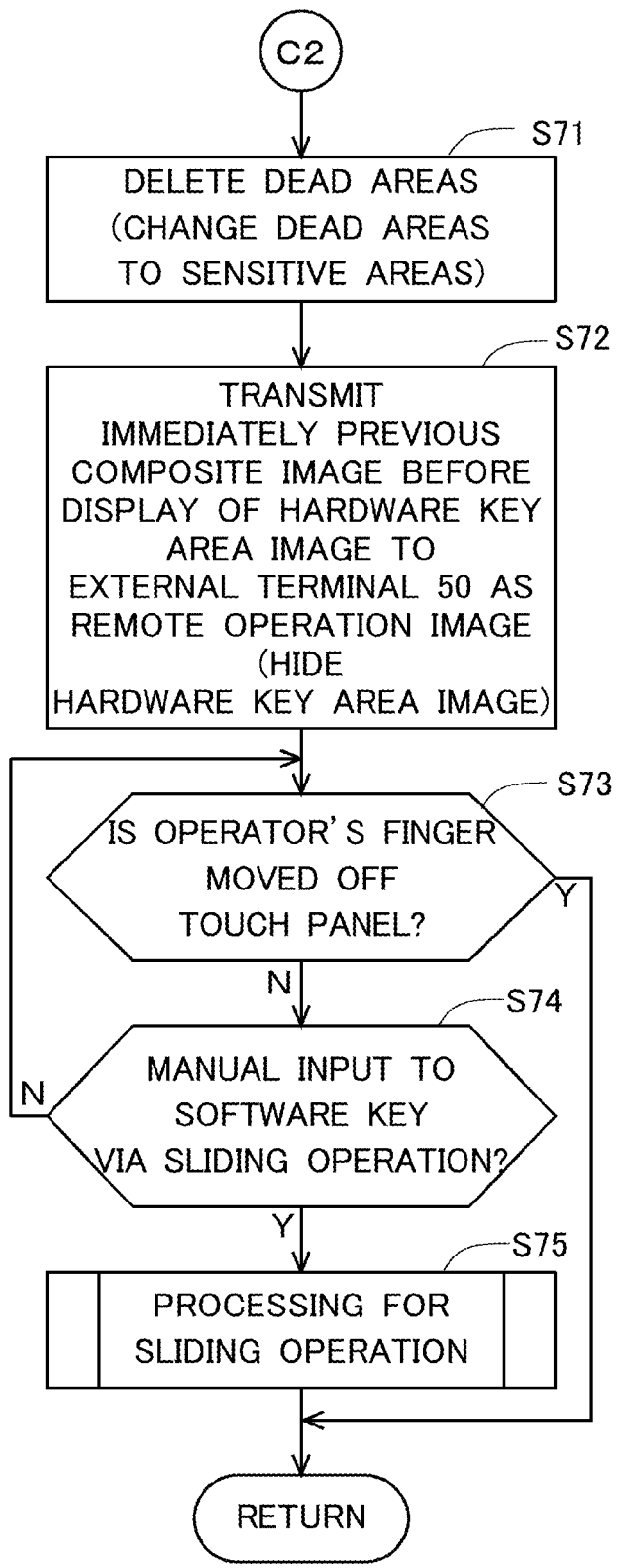
FIG. 18 is a flowchart of operations performed by the image forming apparatus of the second embodiment.

FIGS. 16 and 18 are flowcharts of operations performed by an MFP 10 according to the second embodiment. Specifically, FIG. 16 is a flowchart created by adding steps S63 to S65 after step S62 in the flowchart of FIG. 8 described in the first embodiment. FIG. 18 is a flowchart created by adding steps S73 to S75 after step S72 in the flowchart of FIG. 9 described in the first embodiment.

Hereinafter, the operations performed in the image forming system 1 of the second embodiment will be described with reference to the flowcharts of FIGS. 16 and 18.

2-1. Misoperation on Software Key 225

First is a description of operations performed when the operator of the external terminal 50 has mistakenly touched the software key 225 in the remote operation image 124 (see FIG. 13) instead of touching the projection portion 265. Note that similar operations can also be performed when the software key 224 is mistakenly touched.

When misoperation by the operator of the external terminal 50 provides manual input of touching the sensitive area SA of the software key 225 in the remote operation image 124 shown in FIG. 13, it is determined in step S51 in the flowchart of FIG. 7 that there is manual input to the software key 225, and the processing proceeds to step S55.

In step S55, the MFP 10 determines on the basis of the manual input information MI whether or not the dead area DA of the software key 220 (225) has been touched on the external terminal 50. In the present example, it is determined on the basis of the manual input information MI that the area of the software key 220 (225) other than the dead area DA has been touched, and the processing in the flowchart of FIG. 16 is performed.

Figure 15:
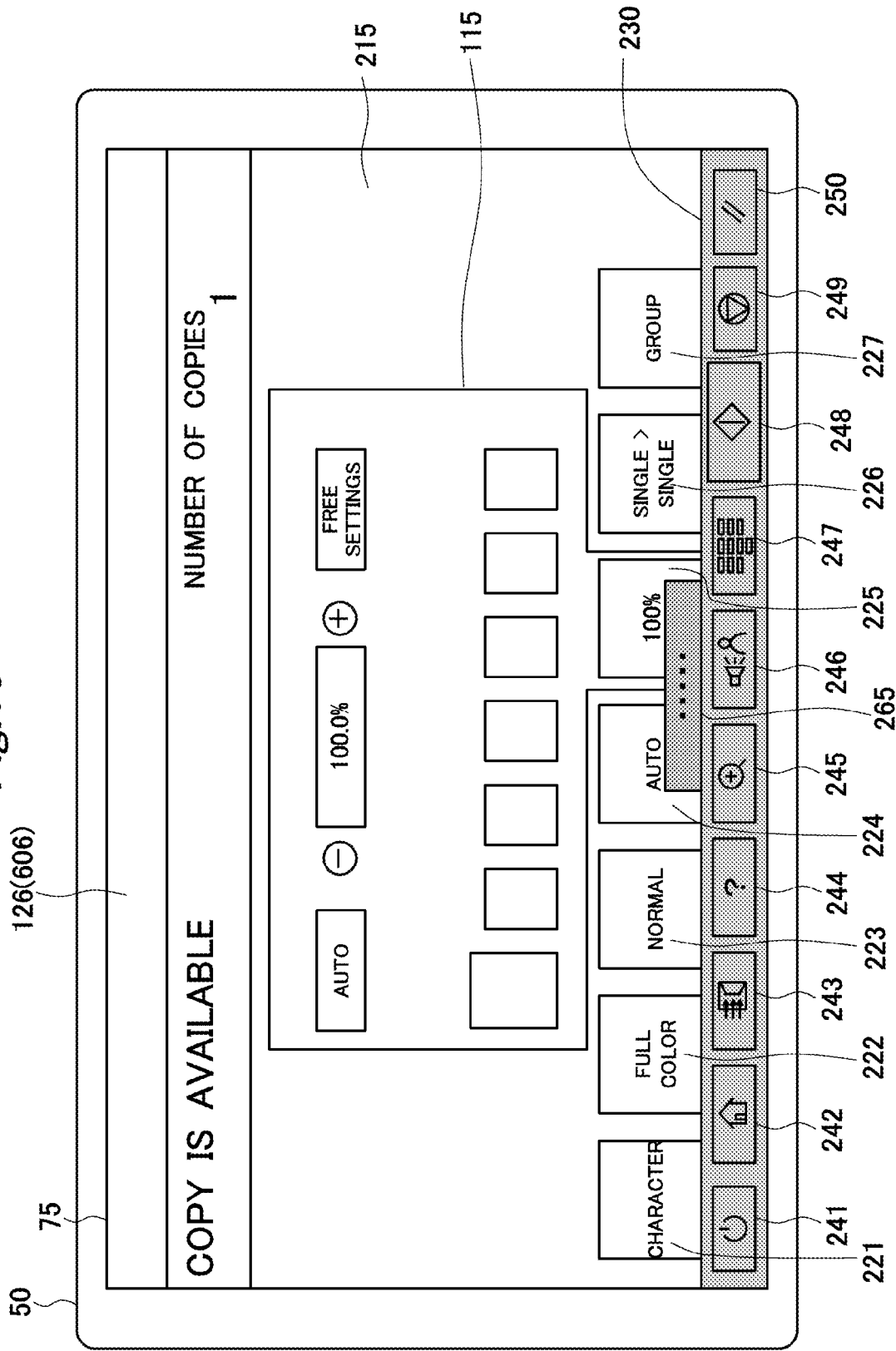
FIG. 15 illustrates a remote operation image displayed on the external terminal.

First, in step S61 in FIG. 16, the MFP 10 generates a composite image 606 by combining a new operation screen image 215 (see FIG. 15) and the hardware key area image 230 (see FIG. 15). The operation screen image 215 is an image (see FIG. 15) in which the setting screen 115 corresponding to the software key 225 is displayed over the operation screen image 213 (see FIG. 12)

In step S62, the MFP 10 transmits image data DT6 of the composite image 606 to the external terminal 50 as data for displaying a remote operation image 126. In response to this, the communication control unit 61 of the external terminal 50 receives the image data DT6 of the composite image 606. Then, the input/output control unit 65 of the external terminal 50 displays the composite image 606 based on the image data DT6 as the remote operation image 126 on the touch panel 75 (see FIG. 15).

In step S63, the MFP 10 determines on the basis of the manual input information MI transmitted from the external terminal 50 whether or not the finger of the operator of the external terminal 50 is moved off the touch panel 75. Note that the manual input information MI includes status information as to whether or not there is a finger touch on the touch panel 75 (a "contact state" or a "non-contact state") and coordinate information on the position of manual input (contact position) in the remote operation image 126. If it is determined that the operator's finger is moved off the touch panel 75, the MFP 10 determines that the manual input to the software key 220 by the operator is proper input, and ends the processing in the flowchart of FIG. 16. On the touch panel 75 of the external terminal 50, the remote operation image 126 continues to be displayed. On the other hand, if it is determined that the operator's finger is not moved off the touch panel 75, the processing proceeds to step S64.

In the present example, it is assumed that the manual input to the software key 225 by pressing the software key 225 is continuing on the touch panel 75, and the processing proceeds to step S64.

In step S64, the MFP 10 determines on the basis of the manual input information MI on the manual input to the remote operation image 126 whether or not there is a sliding operation SL1 of sliding to a position within the hardware key area image 230 (including the projection portion 265 and the hardware key images 241 to 250) while the manual input to the software key 225 by pressing the software key 225 is continuing.

If it is determined that there is the sliding operation SL1 while the manual input to the software key 225 by pressing the software key 225 is continuing, the processing proceeds to step S65, and otherwise the processing returns to step S63.

In step S65, the MFP 10 performs processing to be performed upon receipt of a sliding operation. Specifically, the MFP 10 performs processing of step S651 and onward in FIG. 17.

Figure 17:
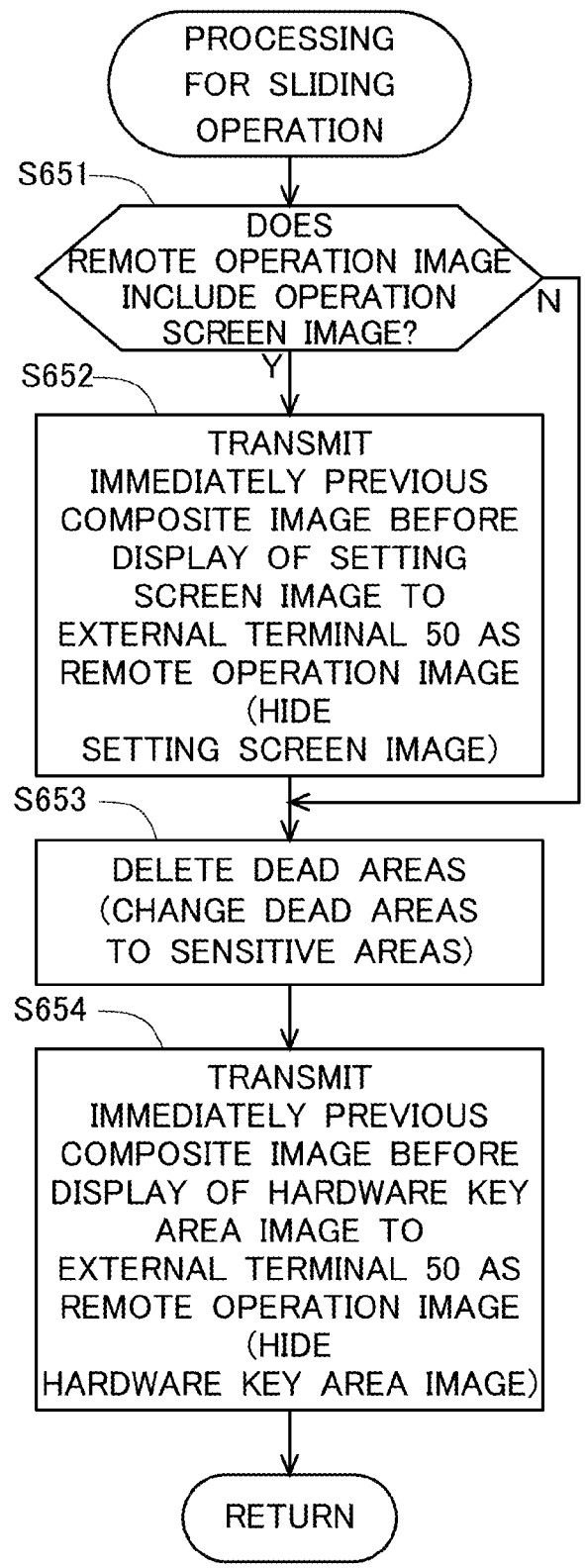
FIG. 17 is a flowchart of operations performed by the image forming apparatus of the second embodiment.

First, in step S651 in FIG. 17, the MFP 10 determines whether or not the remote operation image 126 includes the setting screen 115. If it is determined that the remote operation image 126 includes the setting screen 115, the processing proceeds to step S652. Otherwise, the processing proceeds to step S653. In the present example, it is determined that the remote operation image 126 includes the setting screen 115, and the processing proceeds to step S652.

In step S652, the communication control unit 11 of the MFP 10 re-transmits the immediately previous remote operation image 124 (i.e., the composite image 604) (see FIG. 13) before display of the remote operation image 126 (i.e., the composite image 606) (see FIG. 15) toward the external terminal 50. Accordingly, the remote operation image 124 is again displayed on the touch panel 75 of the external terminal 50. In other words, the setting screen 115 in the remote operation image 126 (see FIG. 15) is hidden (see FIG. 13).

In step S653, the MFP 10 deletes the dead areas DA set in the areas of the software keys 221 to 227. In other words, the MFP 10 sets the entire areas of the software keys 221 to 227 to areas (hereinafter, also referred to as "sensitive areas") SA in which manual input by an operator can be received.

In step S654, the MFP 10 re-transmits the immediately previous composite image 603 before display of the hardware key area image 230 as the remote operation image 123 toward the external terminal 50. Accordingly, the remote operation image 123 is again displayed on the touch panel 75 of the external terminal 50. In other words, the hardware key area image 230 in the remote operation image 124 (see FIG. 13) is hidden (see FIG. 12).

With the operations described above, even if the software key 225 is mistakenly touched instead of touching the projection portion 265, it is possible to hide the setting screen 115 that is mistakenly displayed as a result of touching the software key 225 and it is also possible to hide the hardware key area image 230 that is originally intended to be hidden.

2-2. Misoperation on Projection Portion 265

Next is a description of operations performed when the operator of the external terminal 50 has mistakenly touched the projection portion 265 in the remote operation image 124 (see FIG. 13) instead of touching the software key 225. Note that similar operations can also be performed when the operator of the external terminal 50 has mistakenly touched the projection portion 265 instead of touching the software key 224.

When manual input to the projection portion (non-display instruction key image) 265 has been received in the remote operation image 124 shown in FIG. 13, the MFP determines in step S53 in the flowchart of FIG. 7 that there is manual input to the projection portion 265, and performs processing of step S71 and onward in FIG. 18.

First, in step S71 in FIG. 18, the MFP 10 deletes the dead areas DA set in the areas of the software keys 221 to 227. In other words, the MFP 10 sets the entire areas of the software keys 221 to 227 to sensitive areas SA.

In step S72, the communication control unit 11 of the MFP 10 re-transmits the immediately previous remote operation image 123 (i.e., the composite image 603) (see FIG. 12) before display of the remote operation image 124 (i.e., the composite image 604) (see FIG. 13) toward the external terminal 50. Accordingly, the remote operation image 123 is again displayed on the touch panel 75 of the external terminal 50. In other words, the hardware key area image 230 in the remote operation image 124 (see FIG. 13) is hidden (see FIG. 12).

In step S73, the MFP 10 determines on the basis of the manual input information MI transmitted from the external terminal 50 whether or not the operator's finger is moved off the touch panel 75. Note that the manual input information MI includes status information as to whether or not there is a finger touch on the touch panel 75 (a "contact state" or a "non-contact state") and coordinate information on the position of manual input (contact position) in the remote operation image 124. If it is determined that the operator's finger is moved off the touch panel 75, the MFP 10 determines that the manual input to the projection portion 265 by the operator is proper input, and ends the processing shown in the flowchart of FIG. 18. On the touch panel of the external terminal 50, the remote operation image 124 continues to be displayed. On the other hand, if it is determined that the operator's finger is not moved off the touch panel 75 of the external terminal 50, the processing proceeds to step S74.

In the present example, it is determined that the manual input to the projection portion 265 by pressing the projection portion 265 is continuing on the touch panel 75, and the processing proceeds to step S74.

In step S74, the MFP 10 determines on the basis of the manual input information MI on the manual input to the remote operation image 124 whether or not there is a sliding operation SL2 of sliding to a position within the area of a software key 220 (e.g., the software key 225 adjacent to the projection portion 265) while the manual input to the projection portion 265 by pressing the projection portion 265 is continuing. One example of the sliding operation SL2 is an operation of the operator sliding his/her finger from a position outside the software key 225 to a position within the area of the software key 225. It is, however, often the case that, when the projection portion 265 is continuing to be pressed, the original press position naturally fit into the area of the software key 225 because the manual input to the projection portion 265 causes the hardware key area image 230 in the remote operation image 124 (see FIG. 13) to be hidden (see FIG. 12). In this case, even the operator's operation of sliding his/her finger from the original press position within the area of the software key 225 to another position within the area of the software key 225 may also be regarded as the sliding operation SL2. In this way, the sliding operation SL2 involves not only the operation of sliding from a position outside the area of the software key 225 to a position within the area of the software key 225, but also the operation of sliding from a certain position to another within the area of the software key 225.

If it is determined that there is manual input via the sliding operation SL2, the processing proceeds to step S75. Otherwise the processing returns to step S73. The present example assumes a situation in which there is the sliding operation SL2 of sliding to a position within the area of the software key 225 while the manual input to the projection portion 265 by pressing the projection portion 265 is continuing. Thus, the processing proceeds from step S74 to step S75.

In step S75, the MFP 10 performs processing to be performed upon receipt of a sliding operation. Specifically, the MFP 10 performs processing shown in the flowchart of FIG. 19.

Figure 19:
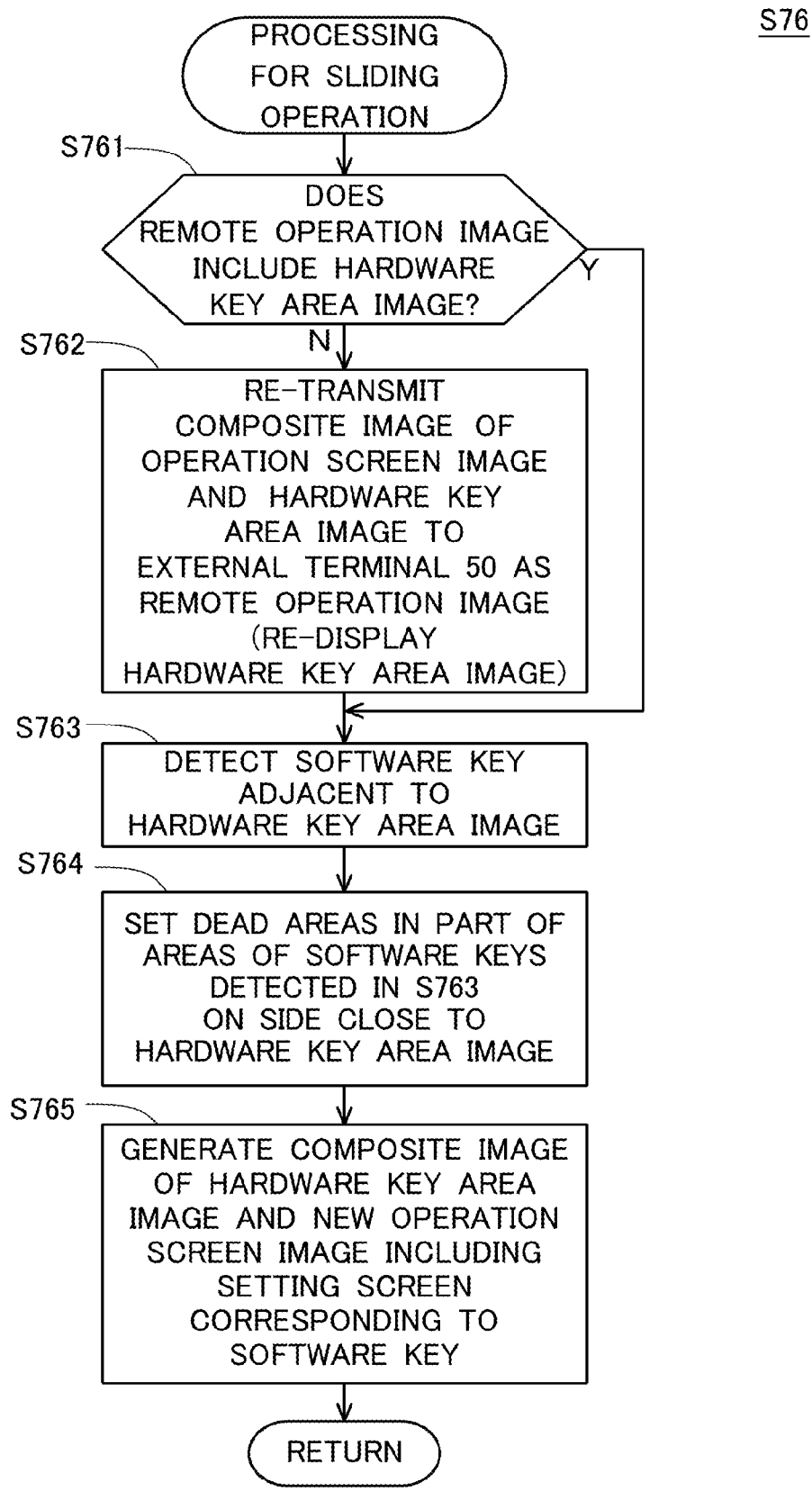
FIG. 19 is a flowchart of operations performed by the image forming apparatus of the second embodiment.

In step S761 in FIG. 19, the MFP 10 determines whether or not the remote operation image 123 includes the hardware key area image 230. In the present example, it is determined that the remote operation image 123 does not include the hardware key area image 230, and the processing proceeds to step S762.

In step S762, the MFP 10 re-transmits the composite image 604 (see FIG. 13) that includes the software keys 221 to 227 and the hardware key area image 230 toward the external terminal 50. Accordingly, the composite image 604 is again displayed as the remote operation image 124 on the touch panel 75 of the external terminal 50 (see FIG. 13). In other words, the hardware key area image 230 that has been once hidden is displayed again.

In step S763, the MFP 10 detects the software keys 221 to 227 as target areas in which the dead areas DA are to be set.

In step S764, the setting unit 15 of the MFP 10 sets the dead areas DA in parts of the areas of the software keys 221 to 227 on the side close to the hardware key area image 230.

In step S765, the MFP 10 re-transmits the composite image 606 (see FIG. 15) including the setting screen 115 corresponding to the software key 225 toward the external terminal 50. Accordingly, the composite image 606 is again displayed as the remote operation image 126 on the touch panel 75 of the external terminal 50 (see FIG. 15).

With the operations described above, even if the projection portion 265 is mistakenly touched instead of touching the software key 225, it is possible for the operator to again display the mistakenly hidden hardware key area image 230 and to display the setting screen 115 that is originally intended to be displayed, through a simple operation of sliding his/her finger to a position within the area of the software key 225 while continuing the manual input to the projection portion 265 by pressing the projection portion 265.

3. Third Embodiment

A third embodiment is a variation of the embodiments described above. The following description focuses on differences from the embodiments described above.

The third embodiment illustrates a mode in which either of two types of operations (touching or flicking) is performed on the projection portion 265, and the content of manual input is determined according to the type of the operation.

The third embodiment also illustrates a mode in which either of the two types of operations is performed on a specific software key 224 or 225 on which the projection portion 265 is superimposed, and the content of manual input is determined according to the type of the operation. Here, a case is illustrated in which either of the two types of operations is performed on the software key 225 on which the projection portion 265 is superimposed.

Mode of Performing Two Types of Operations on Projection Portion 265

First is a description of a mode in which either of the two types of operations is performed on the projection portion 265, and the content of manual input is determined according to the type of the operation. Specifically, a case (1) of flicking the projection portion 265 is described first, and then a case (2) of touching the projection portion 265 is described.

(1) When the projection portion 265 in the remote operation image 124 is flicked (specifically, in a direction in which the hardware key area image 230 is retracted (i.e., a downward flick)), the MFP 10 determines that there is manual input of an instruction to hide the hardware key area image 230. The generation unit 13 of the MFP 10 generates the composite image 603 (see FIG. 12) that includes the software keys 221 to 227 and the display instruction key image 261, but that does not include the hardware key area image 230. Then, the communication control unit 11 of the MFP 10 transmits the image data DT3 of the composite image 603 as data for displaying the remote operation image 123 to the external terminal 50. Accordingly, the remote operation image 123 generated by hiding the hardware key area image 230 in the remote operation image 124 (see FIG. 13) is displayed on touch panel 75 of the external terminal 50. In this way, the operation of flicking the projection portion 265 (specifically, in the direction in which the hardware key area image 230 is retracted) allows the projection portion 265 to function as a non-display instruction key image upon the original principle. In other words, the MFP 10 recognizes the operation of flicking the projection portion 265 as a non-display instruction to hide the hardware key area image 230.

(2) When the projection portion 265 in the remote operation image 124 is touched, the MFP 10 determines that a display instruction to display a setting screen 110 corresponding to a software key 220 disposed adjacent to the projection portion 265 has been received. The generation unit 13 of the MFP 10 generates the composite image 606 (see FIG. 15) that includes the setting screen 110 (e.g., 115) corresponding to a software key (e.g., 225) that is closest to the position at which the projection portion 265 has been touched. More specifically, the generation unit 13 generates the composite image 606 that includes the setting screen 115, the software keys 221 to 227, and the hardware key area image 230. Then, the communication control unit 11 of the MFP 10 transmits the image data DT6 of the composite image 606 as data for displaying the remote operation image 126 to the external terminal 50. Accordingly, the remote operation image 126 (see FIG. 15) in which the setting screen 115 is displayed over the remote operation image 124 (see FIG. 13) is displayed on the touch panel 75 of the external terminal 50. In this way, when having been touched, the projection portion 265 exceptionally does not function as a non-display instruction key image. Specifically, the MFP 10 recognizes the operation of touching the projection portion 265 as the operation of touching the software key 225 disposed adjacent to the projection portion 265.

With the operations described above, the content of manual input is determined differently between when the projection portion 265 is flicked and when the projection portion 265 is touched. Specifically, the MFP 10 recognizes the operation of flicking the projection portion 265 as a non-display instruction to hide the hardware key area image 230, upon the original principle. On the other hand, the MFP 10 exceptionally recognizes the operation of touching the projection portion 265 as the operation of touching a software key 220 disposed adjacent to the projection portion 265. By making appropriate use of the two types of operations on the projection portion 265, it is possible to prevent mishitting in the area between the projection portion 265 and the software keys 224 and 225 on which the projection portion 265 is superimposed.

Mode of Performing Two Types of Operations on Specific Software Key 220

Next is a description of a mode in which either of the two types of operations is performed on a specific software key 224 or 225 on which the projection portion 265 is superimposed, and the content of manual input is determined according to the type of the operation. Specifically, a case (1) of touching the software key 225 is described first, and then a case (2) of flicking the software key 225 (specifically, in a direction in which the hardware key area image 230 is retracted (i.e., a downward flick)) is described.

(1) When the software key 225 in the remote operation image 124 has been touched, the MFP 10 determines that a display instruction to display the setting screen 115 corresponding to the software key 225 has been received. The generation unit 13 of the MFP 10 generates the composite image 606 by combining the setting screen 115 corresponding to the software key 225 with the composite image 605. To be more specific, the generation unit 13 generates the composite image 606 that includes the setting screen 115, the software keys 221 to 227, and the hardware key area image 230. Then, the communication control unit 11 of the MFP 10 transmits the image data DT6 of the composite image 606 as data for displaying the remote operation image 126 to the external terminal 50. Accordingly, the remote operation image 126 (see FIG. 15) in which the setting screen 115 is displayed over the remote operation image 124 (see FIG. 13) is displayed on the touch panel 75 of the external terminal 50. In this way, the operation of touching the software key 225 allows the software key 225 to function as a call key for calling the setting screen 115 upon the original principle. In other words, the MFP 10 recognizes the operation of touching the software key 225 as a display instruction to display the setting screen 115.

(2) When the software key 225 in the remote operation image 124 has been flicked, the MFP 10 determines that a non-display instruction to hide the hardware key area image 230 has been received. The generation unit 13 of the MFP 10 generates the composite image 603 (see FIG. 12) that includes the software keys 221 to 227 and the display instruction key image 261 and that does not include the hardware key area image 230. Then, the communication control unit 11 of the MFP 10 transmits the image data DT3 of the composite image 603 as data for displaying the remote operation image 123 to the external terminal 50. Accordingly, the remote operation image 123 generated by hiding the hardware key area image 230 in the remote operation image 124 (see FIG. 13) is displayed on the touch panel 75 of the external terminal 50. In this way, when having been flicked (specifically, in the direction in which the hardware key area image 230 is retracted), the software key 225 exceptionally does not function as a call key for calling the setting screen 115. Specifically, the MFP 10 recognizes the operation of flicking the software key 225 as a non-display instruction to hide the hardware key area image 230.

With the operations described above, the content of manual input is determined differently between when the specific software key 220 (225) on which the projection portion 265 is superimposed is touched and when the specific software key 220 (225) is flicked. Specifically, the MFP 10 recognizes the operation of touching a specific software key 220 (225) as a display instruction to display the setting screen 115 upon the original principle. On the other hand, the MFP 10 exceptionally recognizes the operation of flicking the specific software key 220 (225) as a non-display instruction to hide the hardware key area image 230. By making appropriate use of the types of operations on the specific software key 224 or 225 on which the projection portion 265 is superimposed, it is possible to prevent mishitting in the area between the projection portion 265 and the specific software keys 224 and 225.

4. Fourth Embodiment

A fourth embodiment is a variation of the embodiments described above. The following description focuses on differences from the above-described embodiments.

The embodiments described above illustrate cases in which the dead areas DA are set within the remote operation image 124 (see FIG. 13) displayed on the touch panel 75 of the external terminal 50.

Figure 20:
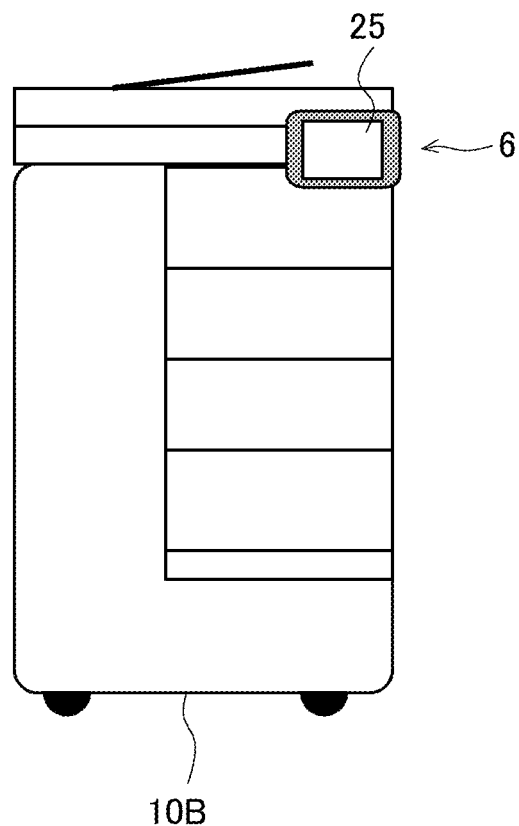
FIG. 20 shows a schematic configuration of an image forming apparatus according to a third embodiment.

The fourth embodiment illustrates a case in which the dead areas DA are set within an operation screen 332 (see FIG. 22) displayed on a touch screen 25 of an MFP 10B (see FIG. 20).

The above-described embodiments illustrate the MFPs 10 (also referred to as "10A") that include a plurality of hardware keys outside the touch screen 25 as shown in FIG. 1.

In contrast, the fourth embodiment illustrates an MFP 10 (also referred to as "10B") that include no hardware keys around the touch screen 25. Unlike the MFP 10A, the MFP 10B has no hardware keys. It is, however, noted that the MFP 10B according to the fourth embodiment is capable of displaying a plurality of software keys 441 to 450 (a key group 320) to be described later that correspond respectively to a plurality of hardware keys provided in the MFP 10A, as necessary, on the touch screen 25 (see FIG. 22). The MFP 10B can reduce cost and show a higher design sense by reducing the number of hardware keys.

On the touch screen 25 of the MFP 10B, a key group 320 (the software keys 441 to 450) to be described later is disposed close to a key group 310 (a plurality of software keys 421 to 427) to be described later. The MFP 10B with such a configuration can adopt the same idea as that applied to the above-described embodiments. Accordingly, even if the two types of key groups 310 and 320 (described later) in an operation screen are disposed close to each other, it is possible to mishitting in the area between the key groups and to ensure excellent operability of the key group 320.

FIG. 20 is an external view of the MFP 10B according to the fourth embodiment.

As can be seen from the comparison with the operation unit of the MFP 10 in FIG. 1, an operation unit 6 of the MFP 10B shown in FIG. 20 is provided with no hardware keys and is provided with only the touch screen 25.

Figure 21:
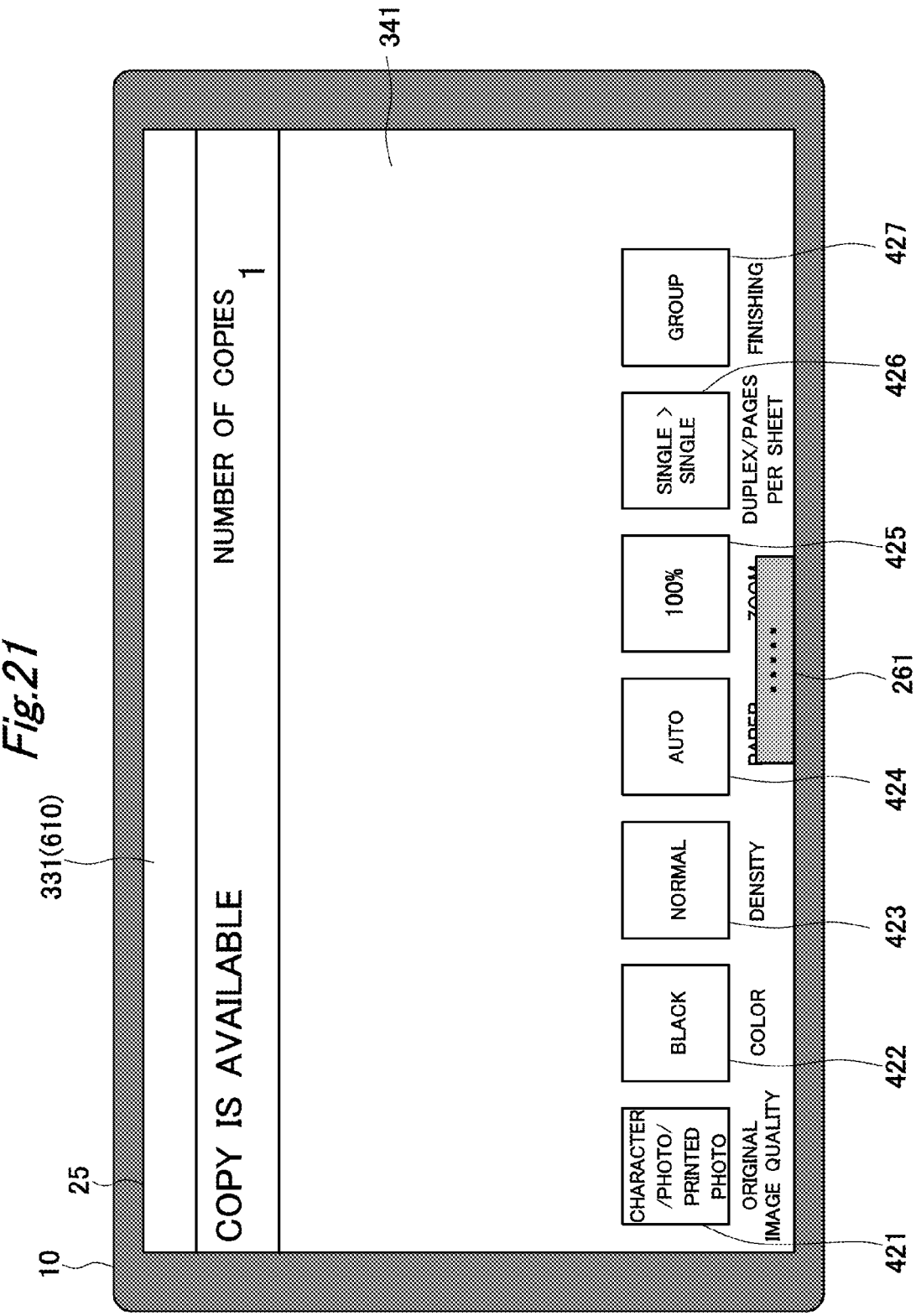
FIG. 21 illustrates an operation screen displayed on an image forming apparatus according to a fourth embodiment.

When the MFP 10B has received a display instruction to display an operation screen 331 (see FIG. 21) via its touch screen 25, the input/output control unit 19 of the MFP 10B displays the operation screen 331 on the touch screen 25 (see FIG. 21). As shown in FIG. 21, the operation screen 331 is a composite image 610 generated by combining an operation screen image 341 and a display instruction key image 261. The operation screen 331 corresponds to the operation screen of the MFP 10B of the fourth embodiment and includes the software keys 421 to 427 (hereinafter, also referred to as the "key group 310"). The display instruction key image 261 is a key image for receiving a display instruction to display a software key area image 342 (see FIG. 22). The software key area image 342 is an image of an area that includes the software keys 441 to 450 (hereinafter, also referred to as the "key group 320") corresponding to the hardware keys of the MFP 10B of the fourth embodiment.

When manual input to the display instruction key image 261 is received in the operation screen 331 shown in FIG. 21, the generation unit 13 of the MFP 10B generates a composite image 620 (see FIG. 22) by combining the operation screen image 341 including the key group 310 with the software key area image 342 including the key group 320. In other words, the generation unit 13 generates the composite image 620 that includes the two types of key groups 310 and 320. Then, the input/output control unit 19 of the MFP 10B displays the composite image 620 including the two types of key groups 310 and 320 as the operation screen 332 on the touch screen 25.

Figure 22:
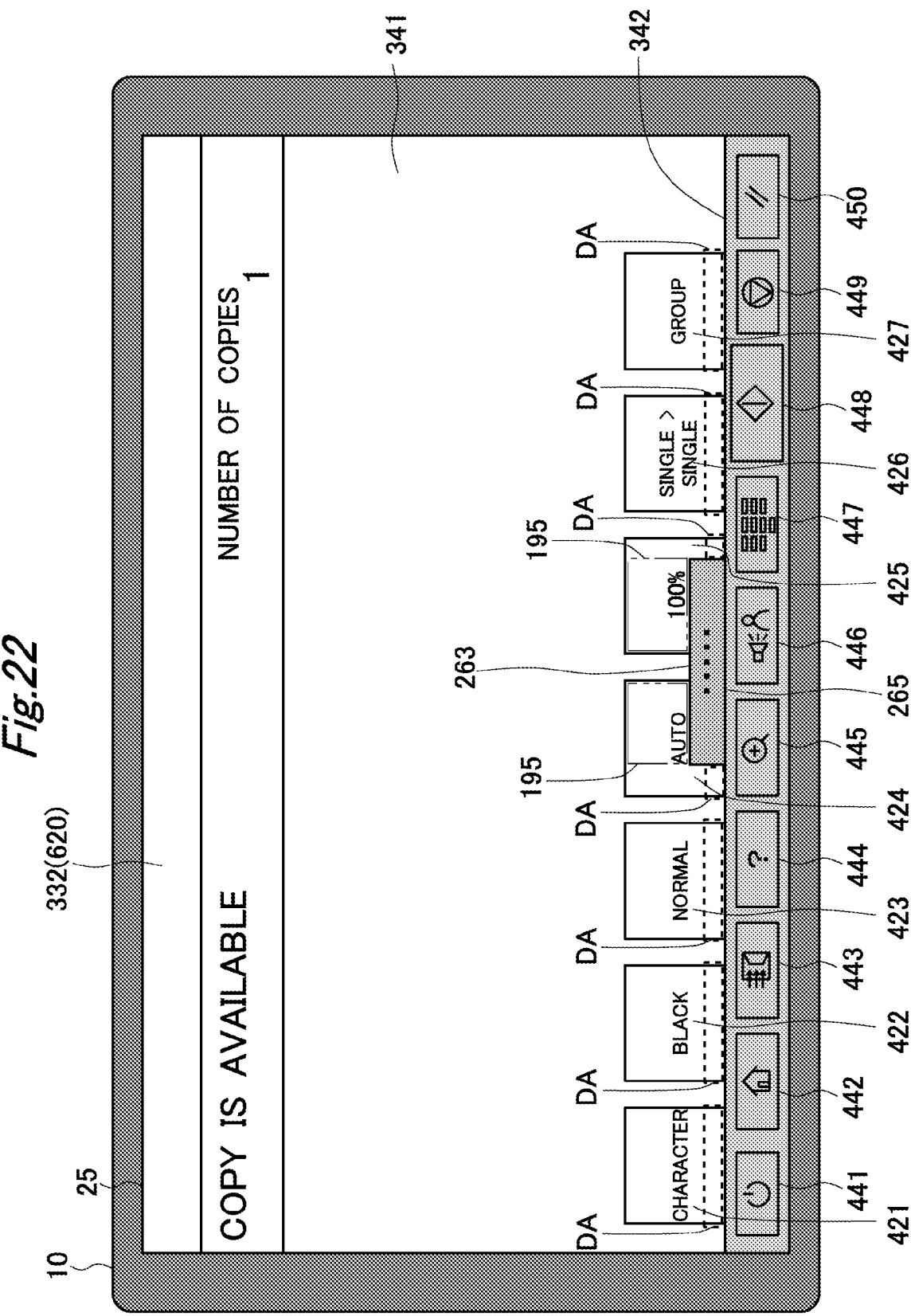
FIG. 22 illustrates an operation screen displayed on the image forming apparatus of the fourth embodiment.

Then, the setting unit 15 of the MFP 10B sets dead areas DA in parts of the areas of the software keys 421 to 427 adjacent to the software key area image 342 among the key group 310 (the software keys 421 to 427), the parts of the areas being on the side close to the software key area image 342 (see FIG. 22). This makes it possible to prevent mishitting in the area between the two types of key groups 310 (the software keys 421 to 427) and 320 (the software keys 441 to 450) in the operation screen 331 even if these key groups are disposed adjacent to each other.

However, as in the embodiments described above, the setting unit 15 sets no dead areas DA in areas 195 of the software keys 424 and 425 on which the projection portion 265 is superimposed, the areas 195 facing face the long side 263 of the substantially rectangular projection portion 265 on the projection side (see FIG. 22). This avoids a reduction in the sensitive areas SA of the software keys 424 and 425, thus preventing a reduction in the operability of the software keys 424 and 425.

The setting unit 15 also sets no dead areas DA in the area of the key group 320 (the software keys 441 to 450) included in the software key area image 342 (see FIG. 22). This prevents the sensitive area SA of the key group 320 from being narrowed, making it possible to ensure excellent operability of at least the key group 320 among the two types of key groups 310 and 320.

5. Variations

While the above has been a description of embodiments of the present invention, the present invention is not intended to be limited to the examples described above.

Figure 23:
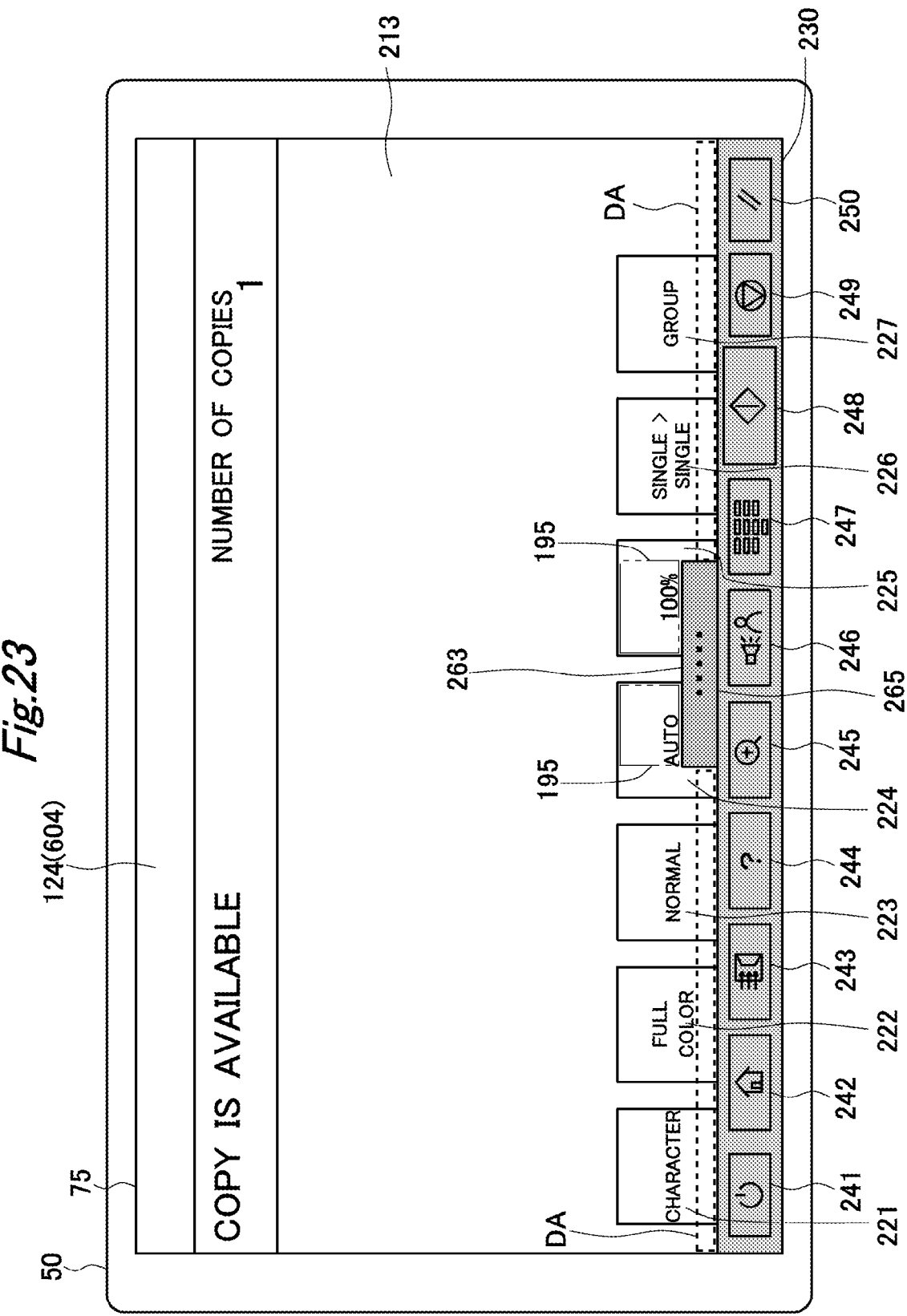
FIG. 23 illustrates a remote operation image displayed on the external terminal.

While in the above-described embodiments, the dead areas DA are set in the areas of the individual software keys 220 (221 to 227) in the remote operation image 124 (see FIG. 13), the present invention is not limited thereto. Specifically, a comprehensive dead area DA may be set in the area of a plurality of software keys 220. More specifically, as shown in FIG. 23, a dead area DA may be set as a transversely elongated strip portion (a strip portion adjacent to the hardware key area image 230) that spans the software keys 221 to 224. Similarly, a dead area DA may be set as a transversely elongated strip portion (a strip portion adjacent to the hardware key area image 230) that spans the software keys 225 to 227. In other words, a comprehensive dead area DA may be set in not only the area of each software key on the side close to the hardware key area image 230, but also in the space between each software key 220 and other software keys 220 adjacent to the software key 220.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image forming apparatus remotely operated by an external terminal, comprising:
   a hardware processor configured to:
   generate a first composite image by combining an operation screen image and a hardware key area image, the operation screen image corresponding to an operation screen of the image forming apparatus, the operation screen including a plurality of software keys, and the hardware key area image being an image of an area that includes a plurality of hardware key images corresponding to a plurality of hardware keys of the image forming apparatus;

not set a dead area within the plurality of hardware key images and to set the dead area in a portion of an area of at least one first software key among the plurality of software keys, the portion being on a side close to the hardware key area image, and the at least one first software key being adjacent to the hardware key area image;

transmit the first composite image as a remote operation image to the external terminal, the remote operation image being an image for use in remote operation of the image forming apparatus;

receive first manual input information from the external terminal, the first manual input information being information on manual input to the first composite image displayed as the remote operation image in the external terminal; and determine a content of manual input by an operator on the basis of the first manual input information, the hardware processor being further configured to:

when determining on the basis of the first manual input information that the external terminal accepts a touch operation in which a portion other than the dead area is touched within an area of one software key of the at least one first software key, determine that there is manual input to the one software key;

when determining on the basis of the first manual input information that the external terminal accepts a touch operation in which the dead area within the area of the at least one first software key is touched, determine that there is no manual input to the at least one first software key; and when determining on the basis of the first manual input information that the external terminal accepts a touch operation in which one hardware key image among the plurality of hardware key images is touched, determine that there is manual input to the one hardware key image.

2. The image forming apparatus according to claim 1, wherein the hardware key area image has a substantially rectangular projection portion that projects toward the operation screen image along part of a boundary between the operation screen image and the hardware key area image, the projection portion is superimposed on at least one second software key among the plurality of software keys, and the hardware processor is further configured to not set the dead area in an area that faces a long side of the substantially rectangular projection portion on a projecting side within an area of the at least one second software key on which the projection portion is superimposed.

3. The image forming apparatus according to claim 2, wherein the projection portion functions as a non-display instruction key image for receiving an instruction to not display the hardware key area image.

4. The image forming apparatus according to claim 3, wherein at least one of the at least one second software keys is a call key for receiving an instruction to call a setting screen regarding a function of the image forming apparatus, when the hardware processor determines on the basis of the first manual input information that the external terminal accepts manual input to the call key, the hardware processor generates a second composite image that includes an image of the setting screen, the plurality of software keys, and the hardware key area image, the hardware processor transmits the second composite image as the remote operation image to the external terminal, and the reception unit receives second manual input information from the external terminal, the second manual input information being information on manual input to the second composite image displayed as the remote operation image at the external terminal, and when the hardware processor determines on the basis of the second manual input information that a sliding operation of sliding to a position within the hardware key area image is accepted while the manual input to the call key by pressing the call key is continuing, the hardware processor generates a third composite image that includes the plurality of software keys and a display instruction key image for receiving an instruction to display the hardware key area image and that does not include an image of the setting screen and the hardware key area image, and the hardware processor transmits the third composite image as the remote operation image to the external terminal.

5. The image forming apparatus according to claim 3, wherein at least one of the at least one second software keys is a call key for receiving an instruction to call a setting screen regarding a function of the image forming apparatus, when the hardware processor determines on the basis of the first manual input information that the external terminal accepts manual input to the projection portion, the hardware processor generates a second composite image that includes the plurality of software keys and a display instruction key image for receiving an instruction to display the hardware key area image and that does not include the hardware key area image, the hardware processor transmits the second composite image as the remote operation image to the external terminal, and the hardware processor receives second manual input information from the external terminal, the second manual input information being information on manual input to the second composite image displayed as the remote operation image on the external terminal, and when the hardware processor determines on the basis of the second manual input information that a sliding operation of sliding to a position within an area of the call key is accepted while the manual input to the projection portion by pressing the projection portion is continuing, the hardware processor generates a third composite image that includes an image of the setting screen, the plurality of software keys, and the hardware key area image, and the hardware processor transmits the third composite image as the remote operation image to the external terminal.

6. The image forming apparatus according to claim 3, wherein at least one of the at least one second software keys is a call key for receiving an instruction to call a setting screen regarding a function of the image forming apparatus, when the hardware processor determines on the basis of the first manual input information that the external terminal accepts first manual input that is manual input made to the projection portion through a first type of operation, the hardware processor generates a second composite image that includes the plurality of software keys and a display instruction key image for receiving an instruction to display the hardware key area image and that does not include the hardware key area image, and the hardware processor transmits the second composite image as the remote operation image to the external terminal, and when the hardware processor determines on the basis of the first manual input information that the external terminal accepts second manual input that is manual input made to the projection portion through a second type of operation, the hardware processor generates a third composite image that includes an image of the setting screen corresponding to the call key disposed adjacent to the projection portion, the plurality of software keys, and the hardware key area image, and the hardware processor transmits the third composite image as the remote operation image to the external terminal.

7. The image forming apparatus according to claim 3, wherein at least one of the at least one second software keys is a call key for receiving an instruction to call a setting screen regarding a function of the image forming apparatus, when the hardware processor determines on the basis of the first manual input information that the external terminal accepts first manual input that is manual input made to the call key through a first type of operation, the hardware processor generates a second composite image that includes an image of the setting screen corresponding to the call key, the plurality of software keys, and the hardware key area image, and the hardware processor transmits the second composite image as the remote operation image to the external terminal, and when the hardware processor determines on the basis of the second manual input information that the external terminal accepts second manual input that is manual input made to the call key through a second type of operation, the hardware processor generates a third composite image that includes the plurality of software keys and a display instruction key image for receiving an instruction to display the hardware key area image and that does not include the hardware key area image, and the hardware processor transmits the third composite image as the remote operation image to the external terminal.

8. An image forming apparatus comprising:

a hardware processor configured to:

generate a first composite image by combining a first image and a second image, the first image including a first software key group, and the second image being an image of an area that includes a second software key group different from the first software key group;

not set a dead area within an area of the second software key group and to set a dead area in a portion of an area of at least one software key in the first software key group adjacent to the second software key group, the portion being on a side close to the second image;

display and output the first composite image as an operation screen of the image forming apparatus to and on an input/output unit of the image forming apparatus, and receive first manual input information on manual input to the first composite image displayed as the operation screen, when the first composite image is displayed and output to the input/output unit, the first composite image includes the dead area; and determine a content of manual input by an operator, on the basis of the first manual input information, the hardware processor being further configured to:

when determining on the basis of the first manual input information that the input/output unit accepts a touch operation in which a portion other than the dead area is touched within an area of a first software key that is one of the at least one software key, determine that there is manual input to the first software key;

when determining on the basis of the first manual input information that the input/output unit accepts a touch operation in which the dead area within an area of the at least one software key among the first software key group is touched, determine that there is no manual input to the at least one software key, and when determining on the basis of the first manual input information that the input/output unit accepts a touch operation in which a second software key that is one software key in the second software key group is touched, determine that there is manual input to the second software key.

9. A non-transitory computer-readable recording medium that records a program for causing a computer built into an image forming apparatus that is remotely operated by an external terminal to execute the steps of:

a) generating a first composite image by combining an operation screen image and a hardware key area image, the operation screen image corresponding to an operation screen of the image forming apparatus, the operation screen including a plurality of software keys, and the hardware key area image being an image of an area that includes a plurality of hardware key images corresponding to a plurality of hardware keys of the image forming apparatus;

b) not setting a dead area within the plurality of hardware key images but setting the dead area in a portion of an area of at least one software key among the plurality of software keys, the portion being on a side close to the hardware key area image, and the at least one software key being adjacent to the hardware key area image;

c) transmitting the first composite image as a remote operation image to the external terminal, the remote operation image being an image for use in remote operation of the image forming apparatus;

d) receiving first manual input information from the external terminal, the first manual input information being information on manual input to the first composite image displayed as the remote operation image in the external terminal; and e) determining a content of manual input by an operator on the basis of the first manual input information, the step e) including the steps of:

e-1) when it is determined on the basis of the first manual input information that the external terminal accepts a touch operation in which a portion other than the dead area is touched within an area of one software key of the at least one software key, determining that there is manual input to the one software key;

e-2) when it is determined on the basis of the first manual input information that the external terminal accepts a touch operation in which the dead area within the area of the at least one software key is touched, determining that there is no manual input to the at least one software key; and e-3) when it is determined on the basis of the first manual input information that the external terminal accepts a touch operation in which one hardware key image among the plurality of hardware key images is touched, determining that there is manual input to the one hardware key image.

10. A non-transitory computer-readable recording medium that records a program for causing a computer built into an image forming apparatus remotely operated by an external terminal to execute the steps of:

a) generating a first composite image by combining a first image and a second image, the first image including a first software key group, and the second image being an image of an area that includes a second software key group different from the first software key group;

b) not setting a dead area within an area of the second software key group but setting a dead area in a portion of an area of at least one software key in the first software key group adjacent to the second software key group, the portion being on a side close to the second image;

c) displaying and outputting the first composite image as an operation screen of the image forming apparatus to and on an input/output unit of the image forming apparatus, when the first composite image is displayed and output to the input/output unit, the first composite image includes the dead area;

d) receiving first manual input information on manual input to the first composite image displayed as the operation screen; and e) determining a content of manual input by an operator, on the basis of the first manual input information, the step e) including the steps of:

e-1) when it is on the basis of the first manual input information that the input/output unit accepts a touch operation in which a portion other than the dead area is touched within an area of a first software key that is one of the at least one software key, determining that there is manual input to the first software key;

e-2) when it is determined on the basis of the first manual input information that the input/output unit accepts a touch operation in which the dead area within an area of the at least one software key among the first software key group is touched, determining that there is no manual input to the at least one software key, and e-3) when it is on the basis of the first manual input information that the input/output unit accepts a touch operation in which a second software key that is one software key in the second software key group is touched, determining that there is manual input to the second software key.

11. An image forming system comprising:

an image forming apparatus; and an external terminal configured to remotely operate the image forming apparatus, the image forming apparatus including:

a hardware processor configured to:

generate a first composite image by combining an operation screen image and a hardware key area image, the operation screen image corresponding to an operation screen of the image forming apparatus, the operation screen including a plurality of software keys, and the hardware key area image being an image of an area that includes a plurality of hardware key images corresponding to a plurality of hardware keys of the image forming apparatus;

not set a dead area within the plurality of hardware key images and to set the dead area in a portion of an area of at least one software key among the plurality of software keys, the portion being on a side close to the hardware key area image, and the at least one software key being adjacent to the hardware key area image;

transmit the first composite image as a remote operation image to the external terminal, the remote operation image being an image for use in remote operation of the image forming apparatus;

receive first manual input information from the external terminal, the first manual input information being information on manual input to the first composite image displayed as the remote operation image in the external terminal; and determine a content of manual input by an operator on the basis of the first manual input information, the hardware processor being further configured to:

when determining on the basis of the first manual input information that the external terminal accepts a touch operation in which a portion other than the dead area is touched within an area of one software key of the at least one software key, determine that there is manual input to the one software key;

when determining on the basis of the first manual input information that the external terminal accepts a touch operation in which the dead area within the area of the at least one software key is touched, determine that there is no manual input to the at least one software key; and when determining on the basis of the first manual input information that the external terminal accepts a touch operation in which one hardware key image among the plurality of hardware key images is touched, determine that there is manual input to the one hardware key image, and the external terminal including:

a second hardware processor configured to receive the first composite image from the image forming apparatus;

the second hardware processor configured to display the first composite image as the remote operation image on an input/output unit of the external terminal and receive manual input to the remote operation image; and the second hardware processor configured to transmit manual input information on manual input to the remote operation image to the image forming apparatus.

12. A control method for controlling an image forming apparatus remotely operated by an external terminal, comprising the steps of:

a) generating a first composite image by combining an operation screen image and a hardware key area image, the operation screen image corresponding to an operation screen of the image forming apparatus, the operation screen including a plurality of software keys, and the hardware key area image being an image of an area that includes a plurality of hardware key images corresponding to a plurality of hardware keys of the image forming apparatus;

b) not setting a dead area within the plurality of hardware key images but setting the dead area in a portion of an area of at least one first software key among the plurality of software keys, the portion being on a side close to the hardware key area image, and the at least one first software key being adjacent to the hardware key area image;

c) transmitting the first composite image as a remote operation image to the external terminal, the remote operation image being an image for use in remote operation of the image forming apparatus;

d) receiving first manual input information from the external terminal, the first manual input information being information on manual input to the first composite image displayed as the remote operation image in the external terminal; and e) determining a content of manual input by an operator on the basis of the first manual input information, the step e) including the steps of:

e-1) when it is determined on the basis of the first manual input information that the external terminal accepts a touch operation in which a portion other than the dead area is touched within an area of one software key of the at least one first software key, determining that there is manual input to the one software key;

e-2) when it is determined on the basis of the first manual input information that the external terminal accepts a touch operation in which the dead area within the area of the at least one first software key is touched, determining that there is no manual input to the at least one first software key; and e-3) when it is determined on the basis of the first manual input information that the external terminal accepts a touch operation in which one hardware key image among the plurality of hardware key images is touched, determining that there is manual input to the one hardware key image.

13. The control method according to claim 12, wherein
the hardware key area image has a substantially rectangular projection portion that projects toward the operation screen image along part of a boundary between the operation screen image and the hardware key area image,
the projection portion is superimposed on at least one second software key among the plurality of software keys, and
in the step b), the dead area is not set in an area that faces a long side of the substantially rectangular projection portion on a projecting side within an area of the at least one second software key on which the projection portion is superimposed.

14. The control method according to claim 13, wherein
the projection portion functions as a non-display instruction key image for receiving an instruction to not display the hardware key area image.

15. The control method according to claim 14, wherein
at least one of the at least one second software key is a call key for receiving an instruction to call a setting screen regarding a function of the image forming apparatus,
the control method further comprising the steps of:
f) when it is determined in the step e) on the basis of the first manual input information that the external terminal accepts manual input to the call key, generating a second composite image that includes an image of the setting screen, the plurality of software keys, and the hardware key area image;
g) transmitting the second composite image as the remote operation image to the external terminal;
h) receiving second manual input information from the external terminal, the second manual input information being information on manual input to the second composite image displayed as the remote operation image at the external terminal;
i) when it is determined on the basis of the second manual input information that a sliding operation of sliding to a position within the hardware key area image is accepted while the manual input to the call key by pressing the call key is continuing, generating a third composite image that includes the plurality of software keys and a display instruction key image for receiving an instruction to display the hardware key area image and that does not include an image of the setting screen and the hardware key area image; and
j) transmitting the third composite image as the remote operation image to the external terminal.

16. The control method according to claim 14, wherein
at least one of the at least one second software key is a call key for receiving an instruction to call a setting screen regarding a function of the image forming apparatus,
the control method further comprising the steps of:
f) when it is determined in the step e) on the basis of the first manual input information that the external terminal accepts manual input to the projection portion, generating a second composite image that includes the plurality of software keys and a display instruction key image for receiving an instruction to display the hardware key area image and that does not include the hardware key area image;
g) transmitting the second composite image as the remote operation image to the external terminal;
h) receiving second manual input information from the external terminal, the second manual input information being information on manual input to the second composite image displayed as the remote operation image on the external terminal;
i) when it is determined on the basis of the second manual input information that a sliding operation of sliding to a position within an area of the call key is accepted while the manual input to the projection portion by pressing the projection portion is continuing, generating a third composite image that includes an image of the setting screen, the plurality of software keys, and the hardware key area image; and
j) transmitting the third composite image as the remote operation image to the external terminal.

17. The control method according to claim 14, wherein
at least one of the at least one second software key is a call key for receiving an instruction to call a setting screen regarding a function of the image forming apparatus,
the control method further comprising the steps of:
f) when it is determined in the step e) on the basis of the first manual input information that the external terminal accepts first manual input that is manual input made to the projection portion through a first type of operation, generating a second composite image that includes the plurality of software keys and a display instruction key image for receiving an instruction to display the hardware key area image and that does not include the hardware key area image, and transmitting the second composite image as the remote operation image to the external terminal; and
g) when it is determined in the step e) on the basis of the first manual input information that the external terminal accepts second manual input that is manual input made to the projection portion through a second type of operation, generating a third composite image that includes an image of the setting screen corresponding to the call key disposed adjacent to the projection portion, the plurality of software keys, and the hardware key area image, and transmitting the third composite image as the remote operation image to the external terminal.

18. The control method according to claim 14, wherein
at least one of the at least one second software key is a call key for receiving an instruction to call a setting screen regarding a function of the image forming apparatus,
the control method further comprising the steps of:
f) when it is determined in the step e) on the basis of the first manual input information that the external terminal accepts first manual input that is manual input made to the call key through a first type of operation, generating a second composite image that includes an image of the setting screen corresponding to the call key, the plurality of software keys, and the hardware key area image, and transmitting the second composite image as the remote operation image to the external terminal; and
g) when it is determined in the step e) on the basis of the second manual input information that the external terminal accepts second manual input that is manual input made to the call key through a second type of operation, generating a third composite image that includes the plurality of software keys and a display instruction key image for receiving an instruction to display the hardware key area image and that does not include the hardware key area image, and transmitting the third composite image as the remote operation image to the external terminal.

19. The image forming apparatus according to claim 8, wherein a projection portion is provided in the second image so as to superimpose one or more software keys included in a first group of software keys, and no dead area is set in an area within the software key on which the projection portion is superimposed, the area facing a long side of the projection portion on a projection side.

20. The non-transitory computer-readable recording medium according to claim 10, wherein a projection portion is provided in the second image so as to superimpose one or more software keys included in a first group of software keys, and no dead area is set in an area within the software key on which the projection portion is superimposed, the area facing a long side of the projection portion on a projection side.

21. The non-transitory computer-readable recording medium according to claim 9, wherein
the hardware key area image has a substantially rectangular projection portion that projects toward the operation screen image along part of a boundary between the operation screen image and the hardware key area image,
the projection portion is superimposed on at least one second software key among the plurality of software keys, and
the image forming apparatus does not set the dead area in an area that faces a long side of the substantially rectangular projection portion on a projecting side within an area of the at least one second software key on which the projection portion is superimposed.

22. The non-transitory computer-readable recording medium according to claim 21, wherein
the projection portion functions as a non-display instruction key image for receiving an instruction to not display the hardware key area image.

23. The non-transitory computer-readable recording medium according to claim 22, wherein
at least one of the at least one second software keys is a call key for receiving an instruction to call a setting screen regarding a function of the image forming apparatus,
when the image forming apparatus determines on the basis of the first manual input information that the external terminal accepts manual input to the call key, the image forming apparatus generates a second composite image that includes an image of the setting screen, the plurality of software keys, and the hardware key area image, the image forming apparatus transmits the second composite image as the remote operation image to the external terminal, and the reception unit receives second manual input information from the external terminal, the second manual input information being information on manual input to the second composite image displayed as the remote operation image at the external terminal, and
when the image forming apparatus determines on the basis of the second manual input information that a sliding operation of sliding to a position within the hardware key area image is accepted while the manual input to the call key by pressing the call key is continuing, the image forming apparatus generates a third composite image that includes the plurality of software keys and a display instruction key image for receiving an instruction to display the hardware key area image and that does not include an image of the setting screen and the hardware key area image, and the image forming apparatus transmits the third composite image as the remote operation image to the external terminal.

24. The non-transitory computer-readable recording medium according to claim 22, wherein
at least one of the at least one second software keys is a call key for receiving an instruction to call a setting screen regarding a function of the image forming apparatus,
when the image forming apparatus determines on the basis of the first manual input information that the external terminal accepts manual input to the projection portion, the image forming apparatus generates a second composite image that includes the plurality of software keys and a display instruction key image for receiving an instruction to display the hardware key area image and that does not include the hardware key area image, the image forming apparatus transmits the second composite image as the remote operation image to the external terminal, and the image forming apparatus receives second manual input information from the external terminal, the second manual input information being information on manual input to the second composite image displayed as the remote operation image on the external terminal, and
when the image forming apparatus determines on the basis of the second manual input information that a sliding operation of sliding to a position within an area of the call key is accepted while the manual input to the projection portion by pressing the projection portion is continuing, the image forming apparatus generates a third composite image that includes an image of the setting screen, the plurality of software keys, and the hardware key area image, and the image forming apparatus transmits the third composite image as the remote operation image to the external terminal.

25. The non-transitory computer-readable recording medium according to claim 22, wherein
at least one of the at least one second software keys is a call key for receiving an instruction to call a setting screen regarding a function of the image forming apparatus,
when the image forming apparatus determines on the basis of the first manual input information that the external terminal accepts first manual input that is manual input made to the projection portion through a first type of operation, the image forming apparatus generates a second composite image that includes the plurality of software keys and a display instruction key image for receiving an instruction to display the hardware key area image and that does not include the hardware key area image, and the image forming apparatus transmits the second composite image as the remote operation image to the external terminal, and
when the image forming apparatus determines on the basis of the first manual input information that the external terminal accepts second manual input that is manual input made to the projection portion through a second type of operation, the image forming apparatus generates a third composite image that includes an image of the setting screen corresponding to the call key disposed adjacent to the projection portion, the plurality of software keys, and the hardware key area image, and the image forming apparatus transmits the third composite image as the remote operation image to the external terminal.

26. The non-transitory computer-readable recording medium according to claim 22, wherein
- at least one of the at least one second software keys is a call key for receiving an instruction to call a setting screen regarding a function of the image forming apparatus,
- when the image forming apparatus determines on the basis of the first manual input information that the external terminal accepts first manual input that is manual input made to the call key through a first type of operation, the image forming apparatus generates a second composite image that includes an image of the setting screen corresponding to the call key, the plurality of software keys, and the hardware key area image, and the image forming apparatus transmits the second composite image as the remote operation image to the external terminal, and
- when the image forming apparatus determines on the basis of the second manual input information that the external terminal accepts second manual input that is manual input made to the call key through a second type of operation, the image forming apparatus generates a third composite image that includes the plurality of software keys and a display instruction key image for receiving an instruction to display the hardware key area image and that does not include the hardware key area image, and the image forming apparatus transmits the third composite image as the remote operation image to the external terminal.

* * * * *